US012620696B2

(12) United States Patent
Terashita et al.

(10) Patent No.: US 12,620,696 B2
(45) **Date of Patent: *May 5, 2026**

(54) ANTENNA DEVICE FOR VEHICLE

(71) Applicant: YOKOWO CO., LTD., Tokyo (JP)

(72) Inventors: Noritaka Terashita, Tomioka (JP); Yusuke Yokota, Tomioka (JP); Takashi Kaneko, Tomioka (JP)

(73) Assignee: YOKOWO CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/442,241

(22) Filed: Feb. 15, 2024

(65) Prior Publication Data

US 2024/0186687 A1 Jun. 6, 2024

Related U.S. Application Data

(63) Continuation of application No. 17/894,180, filed on Aug. 24, 2022, now Pat. No. 12,068,532, which is a continuation of application No. 16/955,800, filed as application No. PCT/JP2018/047080 on Dec. 20, 2018, now Pat. No. 11,462,822.

(30) Foreign Application Priority Data

Dec. 20, 2017 (JP) ................................ 2017-244548

(51) Int. Cl.
*H01Q 1/32* (2006.01)
*H01Q 1/22* (2006.01)

(52) U.S. Cl.
CPC ............ *H01Q 1/3275* (2013.01); *H01Q 1/22* (2013.01)

(58) Field of Classification Search
CPC .......... H01Q 1/24; H01Q 1/38; H01Q 9/0407; H01Q 1/32
See application file for complete search history.

(56) References Cited

U.S. PATENT DOCUMENTS 7,079,079 B2 7/2006 Jo et al.
2008/0100521 A1 5/2008 Herbert et al.
(Continued)

FOREIGN PATENT DOCUMENTS

CN 104995795 A 10/2015
EP 3086406 A1 10/2016
(Continued)

OTHER PUBLICATIONS

International Search Report and Written Opinion mailed on Feb. 12, 2019 for PCT/JP2018/047080 filed on Dec. 20, 2018, 7 pages.
(Continued)

*Primary Examiner* — Hasan Islam
(74) *Attorney, Agent, or Firm* — XSENSUS LLP

(57) ABSTRACT

An antenna device that is attached to a vehicle, the antenna device including: a resin base; a metal base arranged on the resin base; a metal plate located above the resin base and attached to the metal base so as to be superimposed on a portion of the metal base; a substrate arranged on the metal base; an antenna connected to the substrate; and a plurality of fasteners which fix the metal base and the substrate, wherein one of the plurality of fasteners is positioned at a top-view superimposed area of the metal base and the metal plate.

8 Claims, 23 Drawing Sheets

(56) References Cited

U.S. PATENT DOCUMENTS

| | | | | |
|---|---|---|---|---|
| 2011/0043420 | A1* | 2/2011 | Tateno | H01Q 1/1207 343/725 |
| 2012/0169439 | A1 | 7/2012 | Ikehata et al. | |
| 2014/0125549 | A1 | 5/2014 | Kaneko | |
| 2014/0125550 | A1 | 5/2014 | Kaneko | |
| 2014/0159964 | A1 | 6/2014 | Kaneko | |
| 2015/0065067 | A1 | 3/2015 | Sugimoto et al. | |
| 2015/0200446 | A1 | 7/2015 | Kaneko | |
| 2015/0364826 | A1 | 12/2015 | Kudo | |
| 2016/0315378 | A1 | 10/2016 | Kiriyama et al. | |
| 2017/0077594 | A1 | 3/2017 | Sugimoto et al. | |
| 2017/0093028 | A1 | 3/2017 | Tashiro | |
| 2017/0214112 | A1 | 7/2017 | Ohno et al. | |
| 2017/0317409 | A1 | 11/2017 | Ayatollahi et al. | |
| 2018/0212301 | A1 | 7/2018 | Iino | |
| 2018/0261913 | A1 | 9/2018 | Imamura et al. | |
| 2018/0294555 | A1 | 10/2018 | Nagashima | |

FOREIGN PATENT DOCUMENTS

| | | | |
|---|---|---|---|
| JP | 2005-020660 | A | 1/2005 |
| JP | 2005-110144 | A | 4/2005 |
| JP | 2009-049553 | A | 3/2009 |
| JP | 2011-066647 | A | 3/2011 |
| JP | 2011-151659 | A | 8/2011 |
| JP | 2012-010409 | A | 1/2012 |
| JP | 2012054915 | A | 3/2012 |
| JP | 2012-204996 | A | 10/2012 |
| JP | 2013-110601 | A | 6/2013 |
| JP | 2015-046789 | A | 3/2015 |
| JP | 2015-084575 | A | 4/2015 |
| JP | 2015-159354 | A | 9/2015 |
| JP | 2016-032166 | A | 3/2016 |
| JP | 2017-108395 | A | 6/2017 |
| JP | 2017152810 | A | 8/2017 |
| JP | 6 236515 | B2 | 11/2017 |
| JP | 2018-113507 | A | 7/2018 |
| JP | 2019-080095 | A | 5/2019 |
| WO | 2011/033832 | A1 | 3/2011 |
| WO | 2017/191811 | A1 | 11/2017 |

OTHER PUBLICATIONS

Notice of Reasons for Revocation received for Japanese Patent No. 6546712, mailed on Mar. 13, 2020, 84 pages.

Chinese Office Action issued Apr. 30, 2021, in corresponding Chinese Patent Application No. 201880081856.2.

Extended European Search Report issued Aug. 9, 2021, in corresponding European Patent Application No. 18892764.4.

Extended European Search Report mailed Dec. 3, 2024 in related European Application No. EP24193462.9 (16 pages).

* cited by examiner

ANTENNA DEVICE FOR VEHICLE

CROSS-REFERENCE TO RELATED APPLICATIONS

The present application is a continuation of U.S. application Ser. No. 17/894,180, filed Aug. 24, 2022, which is a continuation of U.S. application Ser. No. 16/955,800, filed Jun. 19, 2020 (now U.S. Pat. No. 11,462,822), which is based on PCT filing PCT/JP2018/047080, filed Dec. 20, 2018, which claims priority to JP 2017-244548, filed Dec. 20, 2017, the entire contents of each are incorporated herein by reference.

TECHNICAL FIELD

The present invention relates to an antenna device for vehicle that is attached to a roof of a vehicle.

BACKGROUND ART

An antenna device for vehicle that is attached to a roof of a vehicle such as an automobile has been known, the antenna device for vehicle accommodating an antenna element in a streamlined case in consideration of fluid resistance. In general, the antenna device for vehicle is mounted on a center in a rear portion of the roof and may be referred to as “shark fin antenna”, “dolphin antenna”, or the like because of the figure of the vehicle with the antenna device for vehicle mounted and the appearance of the antenna device for vehicle.

For example, Patent Literature 1 specifically discloses an antenna device for vehicle in which an antenna case is put on a resin base and a space for accommodating a metal base functioning as a ground plate, an antenna element, and so forth is thereby defined. Patent Literature 1 describes a structure which is provided with a conductor plate having a plate spring portion between the metal base and a roof and thereby prevents a decrease in antenna gain due to unnecessary resonance. That is, in a configuration of Patent Literature 1, a capacitance is increased by the conductor plate provided between the metal base and the roof, its resonance frequency is shifted to a lower side than a communication frequency band of the antenna element, and a decrease in antenna gain may thereby be prevented.

CITATION LIST

Patent Literature

Patent Literature 1: Japanese Patent Laid-open No. 2016-32166

SUMMARY OF INVENTION

Technical Problem

In patent Literature 1, waterproofing is conducted for a gap between a resin base and a roof by a pad, a sealing member, or the like, and reaching of rainwater and so forth to a portion around a conductor plate is prevented as much as possible. However, the shape of the roof as a portion to which an antenna device for vehicle is mounted is not flat. Specifically, the roof has a mildly curved surface, the manner of the curve is different depending on the kind of vehicle or the like on which the antenna device for vehicle is mounted. Thus, it is anticipated that a case will occur where perfect waterproofness may not be secured even by the pad or the sealing member. In this case, corrosion may occur to the conductor plate.

A drastic measure against such corrosion of the conductor plate is omission of the conductor plate. Then, a function for adjusting a resonance frequency of unnecessary resonance so as to be out of communication frequencies, which is given by the conductor plate, has to be ensured by another method.

For example, it is possible to prepare plural kinds of metal bases with different resonance frequencies of the unnecessary resonance and to exchange the metal bases in accordance with the mounting condition. However, the metal base is a precision die-cast product of aluminum or the like. Thus, changes in design, of course, and maintaining multiple kinds take manufacturing cost and management cost compared to a case of maintaining few kinds.

Further, it may be considered that one kind of metal base works adequately if a long side dimension of the metal base is made longer and the resonance frequency of the unnecessary resonance is thereby sufficiently separated from a lower limit of a communication frequency band with a relatively high safety factor. However, this may not be considered as a really preferable solution in terms of costs for the antenna device for vehicle, size reduction of the antenna device for vehicle, appearance of the antenna device for vehicle when mounted on the vehicle, and so forth.

In addition, because the shape of the roof is actually not flat as described above and the manner of the curve is not uniform, the capacitance occurring between the metal base and the roof (ground capacitance) is not determined. Thus, even if the metal base is designed very well, a case may occur where designed performance may not sufficiently be provided depending on the kind of vehicle or the like on which the metal base is mounted.

A challenge for the present invention is to provide a technique for realizing an antenna device for vehicle that prevents a decrease in antenna gain due to unnecessary resonance by a method other than providing a conductor plate between a metal plate and a roof.

Solution to Problem

A first aspect of the present invention provides an antenna device for vehicle that is attached to a roof of a vehicle, the antenna device for vehicle including: an antenna base; an antenna case covering the antenna base from above; and an antenna element provided inside the antenna case, in which the antenna base has a metal base fixed to the roof and a metal plate electrically connected with the metal base.

In the first aspect, the metal plate forms an inductance and a capacitance between the metal plate and the roof, and a resonance frequency of unnecessary resonance may thereby be adjusted. Thus, even if a component corresponding to a conductor plate described in Patent Literature 1 is not provided, a decrease in antenna gain of the antenna element may be inhibited. Further, adjustment of the resonance frequency of the unnecessary resonance is achieved by the metal plate that may be fabricated by sheet metal, and it thereby becomes possible to prepare the metal plates for plural different specifications inexpensively and easily. Thus, while the metal base is provided as a common component, it becomes possible to change the unnecessary resonance occurring between the metal base and the roof easily and inexpensively in accordance with the used metal plate and the mounting positions of the metal plate, and it becomes possible to handle a decrease easily and inexpensively in antenna gain due to the unnecessary resonance for plural kinds of vehicles.

In the antenna device for vehicle, the antenna base may have a shape which has a front-rear direction of the vehicle as a longitudinal direction in an attachment attitude to the roof, the metal plate may be provided on a front end side and/or a rear end side of the metal base in the attachment attitude, and an electrical length which includes the metal base and the metal plate may be longer than an electrical length of only the metal base in the longitudinal direction.

Accordingly, the problem may be solved without changing a lateral width of the antenna device for vehicle. Thus, the antenna device for vehicle in design taking into account air resistance in vehicle travel may be formed.

Further, because the electrical length which includes the metal base and the metal plate is longer than the electrical length of only the metal base, the resonance frequency of the unnecessary resonance is shifted to a low frequency side of a communication frequency band of the antenna element, and a decrease in antenna gain may thereby be inhibited.

In the antenna device for vehicle, the metal plate may have a meander shape or a spiral shape.

Accordingly, the electrical length may more effectively be increased than employing a metal plate in a simple rectangular shape. When a long electrical length may be obtained, it becomes possible to separate the resonance frequency of the unnecessary resonance farther from the communication frequency band. Further, because it becomes possible to realize the same electrical length as a case of a metal plate in a rectangular shape in a small installation area, size reduction of the antenna device for vehicle may be realized. Realization of a small-sized antenna device for vehicle means that a decrease in the installation area with respect to the roof of the vehicle may be realized. This results in a less difference in a decrease inhibition effect of antenna gain due to a difference in a roof shape, and in spite of a single specification, a stable decrease inhibition effect of antenna gain may be obtained for plural vehicles.

In the antenna device for vehicle, the antenna base may have an electrical length adjustment circuit, which adjusts an electrical length between the metal base and the metal plate, and the metal base and the metal plate may be electrically connected together via the electrical length adjustment circuit.

Accordingly, because the electrical length may be changed by the electrical length adjustment circuit, size reduction of the antenna device for vehicle may be intended.

In the antenna device for vehicle, the metal base may have a projection portion for fixing to the roof, and a resonance frequency that occurs due to the roof and the antenna base that are electrically connected together via the projection portion may be out of a communication frequency band of the antenna element.

Accordingly, because the metal base has the projection portion for fixing to the roof, the antenna device for vehicle may be realized that may easily secure the fixing strength to the roof, provide a precise electrical connection between the metal base and the roof, and further provide similar effects to the above-described aspect by the metal plate.

In the antenna device for vehicle, the antenna base may have a resin base, and the metal plate may be arranged on the resin base.

Accordingly, the antenna device for vehicle may be realized in which the metal plate is arranged on the resin base.

In the antenna device for vehicle, the resin base may have a positioning shape portion that inhibits a position shift of the metal plate from a prescribed position of the metal plat.

Accordingly, in manufacturing the antenna device for vehicle, the metal plate may easily be arranged in the prescribed position. Further, a position shift of the metal plate from the prescribed position of the metal plate may be inhibited. Accordingly, attachment work of the metal plate may become easy.

The antenna device for vehicle may further include a second antenna element being different from the antenna element, in which a part or the whole of the second antenna element may be arranged so as to be positioned above the metal plate.

Accordingly, the antenna device for vehicle may be realized in which the second antenna element is arranged such that a part or the whole of the second antenna element is positioned above the metal plate.

In the antenna device for vehicle, the metal base and the metal plate may use different materials.

Alternatively, in the antenna device for vehicle, the metal base and the metal plate may use a same material.

A second aspect of the present invention provides an antenna device for vehicle that is attached to a roof of a vehicle, the antenna device for vehicle including: an antenna base having a metal plate fixed to the roof and a resin base; an antenna case covering the antenna base from above; and an antenna element provided inside the antenna case, in which the metal plate is arranged on the resin base.

In the second aspect, the antenna device for vehicle that provides similar actions and effects to the first aspect, may be configured.

In the antenna device for vehicle, a part or the whole of the antenna element may be positioned above the metal plate, and the metal plate may be formed such that a portion positioned below the antenna element is partially hollowed out.

Accordingly, a decrease in antenna gain may be inhibited.

In the antenna device for vehicle, the antenna base may have a shape which has a front-rear direction of the vehicle as a longitudinal direction in an attachment attitude to the roof, and the metal plate may be provided on a front side and/or a rear side of the antenna base in the attachment attitude.

Accordingly, the problem may be solved without changing a lateral width of the antenna device for vehicle. Thus, the antenna device for vehicle in design taking into account air resistance in vehicle travel may be formed.

DESCRIPTION OF EMBODIMENTS

Examples of embodiments to which the present invention is applied will hereinafter be described; however, it is a matter of course that forms, to which the present invention is applicable, are not limited to the following embodiments.

First Embodiment

Figure 1:
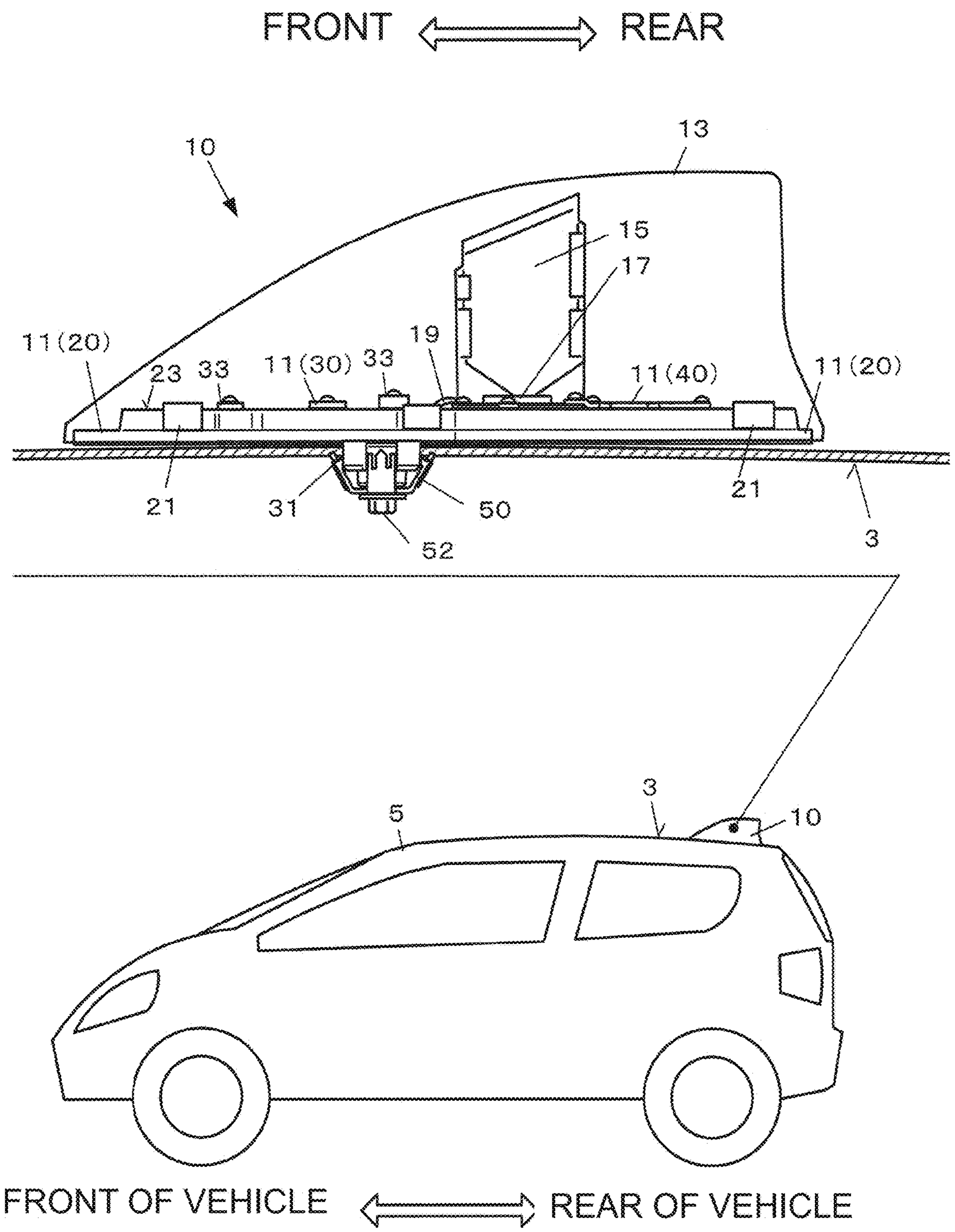
FIG. 1 is a side perspective view that illustrates a configuration example of an antenna device of a first embodiment.
Figure 2:
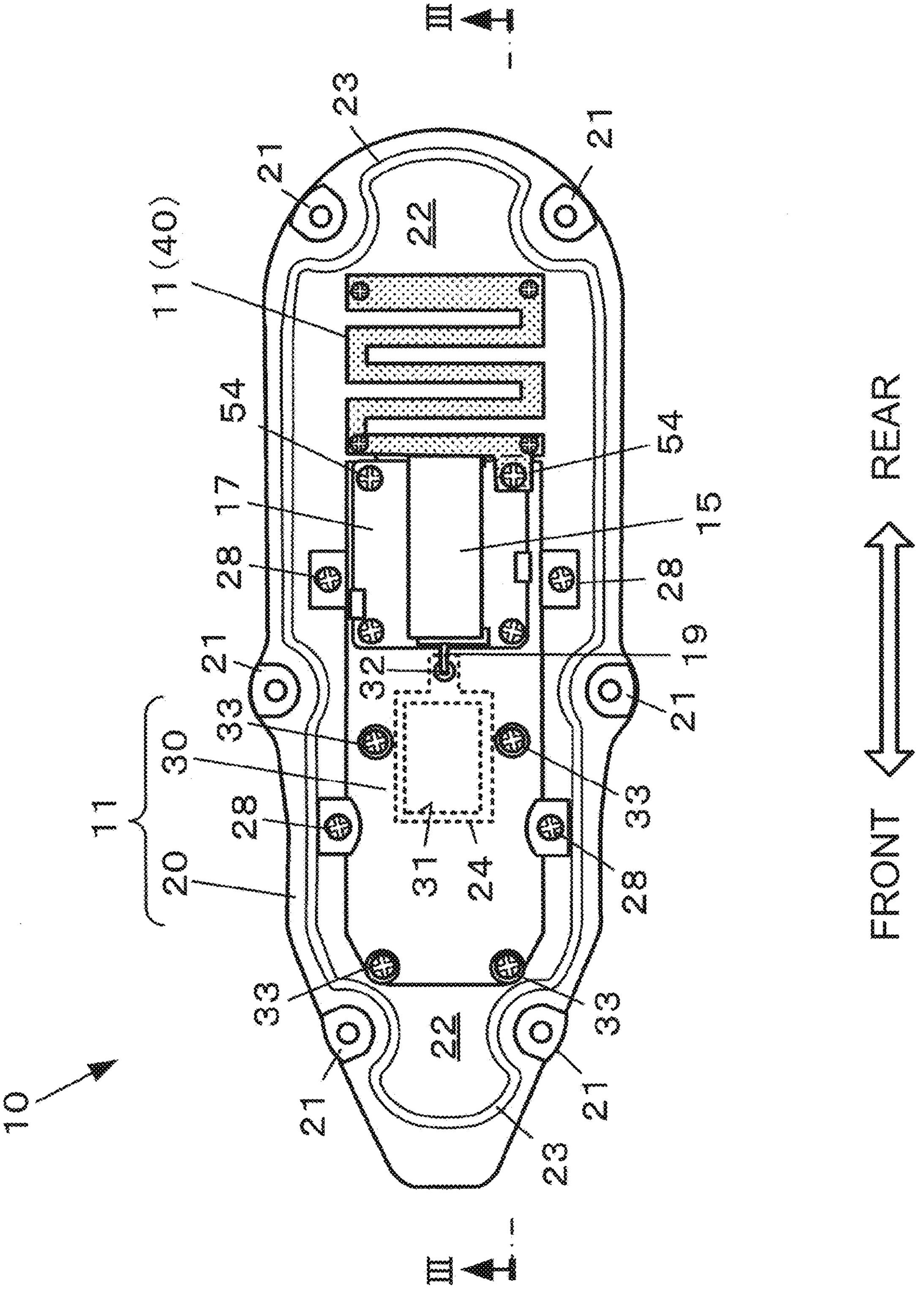
FIG. 2 is an internal plan view of the antenna device of the first embodiment.
Figure 3:
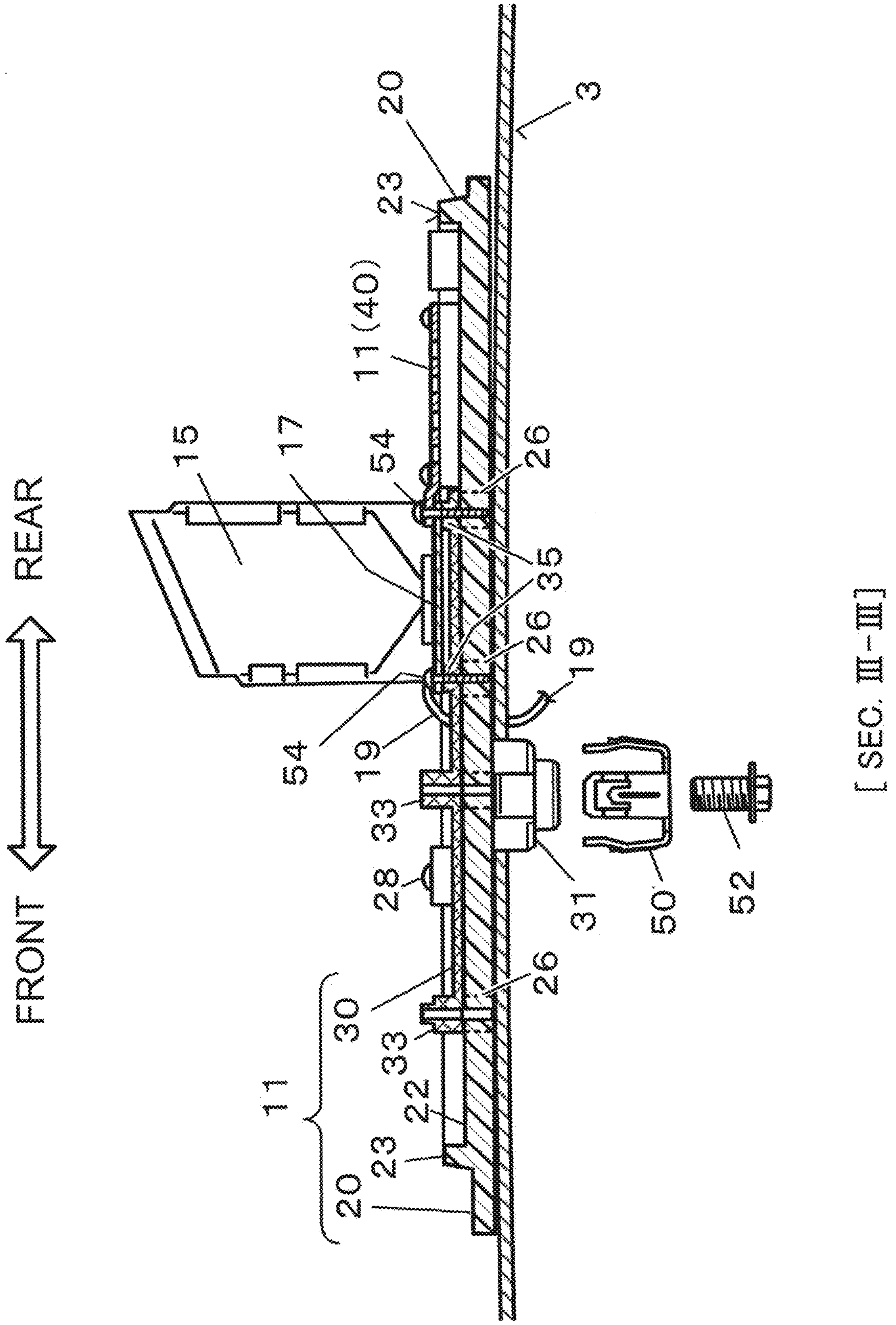
FIG. 3 is a cross-sectional view taken along line III-III in FIG. 2.

FIG. 1 is a side perspective view that illustrates a configuration example of an antenna device 10 of this embodiment. FIG. 2 is a plan view of a state where an antenna case 13 of the antenna device 10 of this embodiment is detached, that is, an internal plan view. FIG. 3 is a cross-sectional view taken along line III-III in FIG. 2.

As illustrated in FIG. 1, the antenna device 10 is an antenna device designed on the assumption that it is mounted on an exterior structure that corresponds to a roof 3 of a vehicle 5 (such as a passenger vehicle, a truck, or an agricultural machine, for example) and is an antenna device that incorporates an antenna element and so forth in a case. “Front and rear” in the antenna device 10 denote the same directions as front and rear of the vehicle 5 in which the antenna device 10 is mounted on the roof 3 and mean the directions illustrated in FIG. 1. That is, those are the front-rear direction along a streamlined external appearance, the side of a relatively low and tapered shape (the left side in FIG. 1) is set as front of the antenna device, and the opposite direction (the right side in FIG. 1) is set as rear.

The antenna device 10 has an antenna base 11 and a resin antenna case 13 that covers a portion above it. The antenna case 13 is usually made of a non-translucent resin such that an internal portion may not be seen, but FIG. 1 depicts only a contour line of the antenna case 13 as if the internal portion were seen through.

The antenna device 10 is formed in a so-called shark fin shape that is long in the front-rear direction as the whole, has a flat mounting surface, and looks like a dorsal fin of a shark or a dolphin in a side view. The antenna device 10 is mounted on an upper surface of the roof 3 such that its longitudinal direction goes along the front-rear direction of the vehicle 5. In other words, the antenna base 11 has a shape that has the front-rear direction of the vehicle as the longitudinal direction in an attachment attitude to the roof 3 of the vehicle 5.

A housing space is defined between the antenna base 11 and the antenna case 13 and incorporates an antenna element 15 and a substrate 17 on which various circuits for an antenna are mounted.

However, configuration elements incorporated in the housing space are not limited to those but may appropriately be selected. For example, although one antenna element 15 is used in this embodiment, a configuration is possible that incorporates plural kinds of separate antenna elements for different purposes of use.

The antenna base 11 of this embodiment has a resin base 20, a metal base 30, and a metal plate 40.

The resin base 20 is a plate-shaped body that forms a main flat bottom surface of the antenna device 10 and is molded with a non-conductive resin. As illustrated in FIG. 2, in an outer circumference, the resin base 20 has plural bosses 21 for screw-fastening the antenna case 13.

Further, in the resin base 20, a rib 23 higher than an outer peripheral portion is formed slightly inside an outer periphery, and a pedestal portion 22 is formed inside the rib 23. An upper surface of the pedestal portion 22 forms a flat surface that is in parallel or generally in parallel with the bottom surface. A penetrating portion 24 that passes through from the face to the back of the resin base 20 is provided in a central portion of the pedestal portion 22 in a top view (see FIG. 2). The penetrating portion 24 is used for inserting a projection portion of the metal base 30 and drawing out a cable 19.

The pedestal portion 22 is provided with plural bosses 26 (see FIG. 3) for screw-fastening the metal base 30, and the metal base 30 is put on (overlays) the pedestal portion 22 from above and is screw-fastened by attachment screws 28 (see FIG. 2).

The metal base 30 is a metal component that is long in the longitudinal direction of the antenna device 10 and is a die-cast product of an aluminum alloy, for example. As illustrated in FIG. 2 and FIG. 3, the metal base 30 has a projection portion 31 (see FIG. 3) that is provided to project below a lower surface and is for fixing to the roof 3, plural bosses 33, and plural substrate attachment screw bosses 35.

The projection portion 31 (see FIG. 3) is a fixing part that is inserted into the vehicle through a penetrating hole provided in the roof 3 and the penetrating portion 24. A capturing fastener 50 is mounted on the inserted projection portion 31, temporary positioning and retainment are conducted for the projection portion 31. An antenna fixing bolt 52 is then fastened into a threaded portion that is threaded in a lower end portion of the projection portion 31, and the projection portion 31 is thereby fixed to the roof 3 (in FIG. 3, the capturing fastener 50 and the antenna fixing bolt 52 are illustrated in an exploded state). Correspondingly, it becomes easy to secure fixing strength to the roof 3. Locking claws of the capturing fastener 50 bite into the roof 3 by fastening the antenna fixing bolt 52, and the metal base 30 and the roof 3 are electrically connected together. That is, grounding is made.

Further, a cable insertion hole 32 (see FIG. 2) is provided in the metal base 30, and the cable 19 from the substrate 17 is drawn into the vehicle through the cable insertion hole 32 and the penetrating portion 24. The cable 19 drawn into the vehicle is connected with a signal cable wired in an internal portion of the vehicle.

The plural bosses 33 are provided from a front side to an intermediate area of the metal base 30 and are used for fixing the metal base 30 to the resin base 20 by machine screws. The plural bosses 33 may be used for fixing in a case where an antenna element or the like for another purpose of use is additionally mounted.

Further, the substrate attachment screw bosses 35 (see FIG. 3) for placing the substrate 17 on which the antenna element 15 is mounted are provided on a rear side of the metal base 30, and the metal base 30 and the substrate 17 together are fixed to the resin base 20 by substrate attachment screws 54. The substrate 17 and the metal base 30 are electrically connected together by the substrate attachment screws 54.

The metal plate 40 is a metal component that is formed from a different material from the metal base 30. For example, the metal plate 40 is a plate material fabricated from sheet metal and is a first electrical length adjustment element for adjusting a resonance frequency of unnecessary resonance in this embodiment. Here, the thickness of the metal plate 40 may be thinner than the thickness of the metal base 30, and the strength of the metal plate 40 may be lower than the strength of the metal base 30. That is, the metal plate 40 may be formed from an inexpensive component compared to the metal base 30. Further, the metal plate 40 may be formed from a conductive resin.

The metal plate 40 is placed on a rear end side of the pedestal portion 22 of the resin base 20 such that a plate surface is opposed to the roof 3 via the resin base 20. In other words, in a case where the metal plate 40 is considered as a portion of the metal base 30, it may be considered that the metal plate 40 is provided such that a top-view superimposed area of only the metal base 30, which is seen to overlap with the roof 3 in a top view, is expanded by inclusion of the metal plate 40. The portion is fastened and fixed to the resin base 20 together with the substrate 17 and the metal base 30 by the substrate attachment screw 54 and is electrically conducted with the substrate 17 and the metal base 30.

In a case where a portion of the metal plate 40 is attached to the metal base 30 so as to be superimposed on the metal base 30, it is possible that the unnecessary resonance occurs due to the superimposed region. Thus, the superimposed region between the metal plate 40 and the metal base 30 is desirably small. For example, in a case where superimposition between the metal plate 40 and the metal base 30 occurs due to fastening those together by the substrate attachment screw 54, the superimposed region is preferably limited to the portions superimposed due to fastening those together.

By attaching the metal plate 40, the strength of the resin base 20 may be enhanced to the strength of the resin base 20 including the metal plate 40 compared to a case where the metal plate 40 is not attached. Specifically, deformation, damage, or the like due to external force or temperature may be prevented. The example of FIG. 1 to FIG. 3 illustrates an example where fixing between the metal plate 40 and the pedestal portion 22 is achieved by screw-fastening, but fixing may be made by protrusion-recess fitting, spring fixing, pressure bonding, or the like.

Further, the portion of the metal plate 40 is fixed to and electrically conducted with the metal base 30 by fastening those together by the substrate attachment screw 54, but another method may be employed. For example, the metal plate 40 and the metal base 30 may be electrically connected together by connecting the metal plate 40 and the metal base 30 together by substrate wiring, a connector, an electrical cord, or the like.

Figure 4:
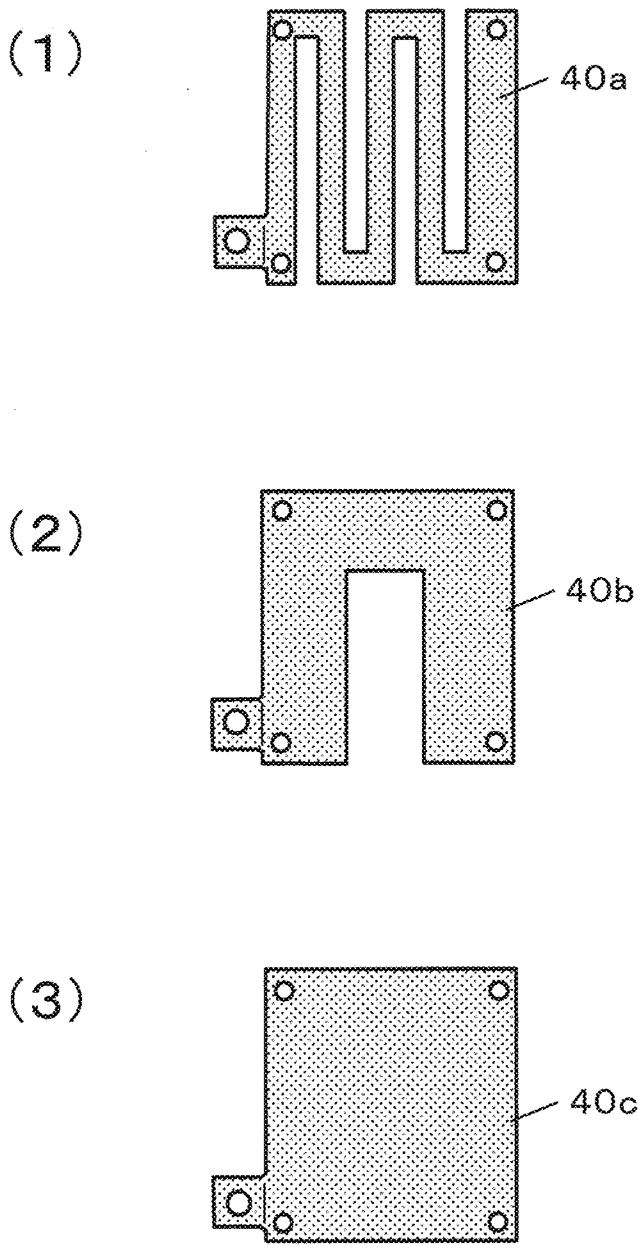
FIG. 4 is a diagram that illustrates examples of kinds of metal plates in the first embodiment.

FIG. 4 is a diagram that illustrates examples of kinds of metal plates 40 in this embodiment. Plural kinds of metal plates 40 with different electrical lengths are prepared. Specifically, in each of (1) to (3) of FIG. 4, the electrical length that includes the metal base 30 and the metal plate 40 in a case where the metal base 30 and the metal plate 40 are connected side-by-side in the longitudinal direction as illustrated in FIG. 1 to FIG. 3 becomes longer than the electrical length of only the metal base 30 in the longitudinal direction (front-rear direction).

For example, a metal plate 40*a* of (1) of FIG. 4 is designed to have notches or slits so as to form a meander shape (serpentine shape). In a case where the electrical length as long as the metal plate 40*a* of (1) of FIG. 4 is not desired, design like a metal plate 40*b* of (2) of FIG. 4 is possible in which the number of repetitions of a serpentine pattern is smaller than that of the metal plate 40*a*. Further, in a case where such a long electrical length is not desired, as a metal plate 40*c* of (3) of FIG. 4, a configuration is possible that has a rectangular flat plate shape without notches or slits. It is a matter of course that versions of the metal plate 40 are not limited to the examples of FIG. 4, but it is possible to appropriately provide other versions such as polygonal shapes and spiral shapes. For example, the metal plate 40 may have a shape in which the opposite end portion to an end portion connected with the metal base 30, between both of the end portions of the metal plate 40, extends so as to surround a periphery of the metal base 30.

Accordingly, even if a conductor plate mentioned in Patent Literature 1 is not provided, by providing the metal plate 40, the resonance frequency of the unnecessary resonance is adjusted so as to be out of a communication frequency band of the antenna element 15, and a decrease in antenna gain may be inhibited. Specifically, an electromagnetic action occurs between the metal plate 40 and the roof 3, the electrical length of the antenna base 11 increases by the electrical length of the metal plate 40 compared to the electrical length of only the metal base 30, and the resonance frequency of the unnecessary resonance that occurs due to the roof 3 and the antenna base 11 may be lowered. As a result, the resonance frequency of the unnecessary resonance may be moved to a lower range than a lower limit of the communication frequency band of the antenna element 15.

A more detailed description will be made. In a case where the antenna device 10 is attached to the roof 3, the unnecessary resonance at the frequency corresponding to the length of the metal base 30 in the longitudinal direction occurs due to the roof 3 and the metal base 30. As the metal base 30 becomes longer, the resonance frequency moves to a low range side. Thus, a method is possible that makes the metal base 30 longer and thereby moves the resonance frequency to the low range side. However, this method increases cost by extension of the length of the metal base 30. It is desired that making the metal base 30 long be avoided because the metal base 30 is a die-cast component that is expensive compared to the metal plate 40. In addition, preparation of different metal bases 30 for plural kinds of vehicles 5 among which shapes and so forth of the roof 3 are different becomes a factor in a cost increase. On the other hand, in this embodiment, because the resonance frequency is moved to the low range side by arranging the metal plate 40 less expensive than the metal base 30, a cost increase may be inhibited. Further, because it is sufficient that the metal base 30 is provided as a common component for plural kinds of vehicles 5 and the metal plate 40 is prepared for each of plural kinds of vehicles 5, a cost increase may also be inhibited in this point.

Next, a description will be made with regard to results of a simulation regarding the antenna device 10 of this embodiment.

Figure 5:
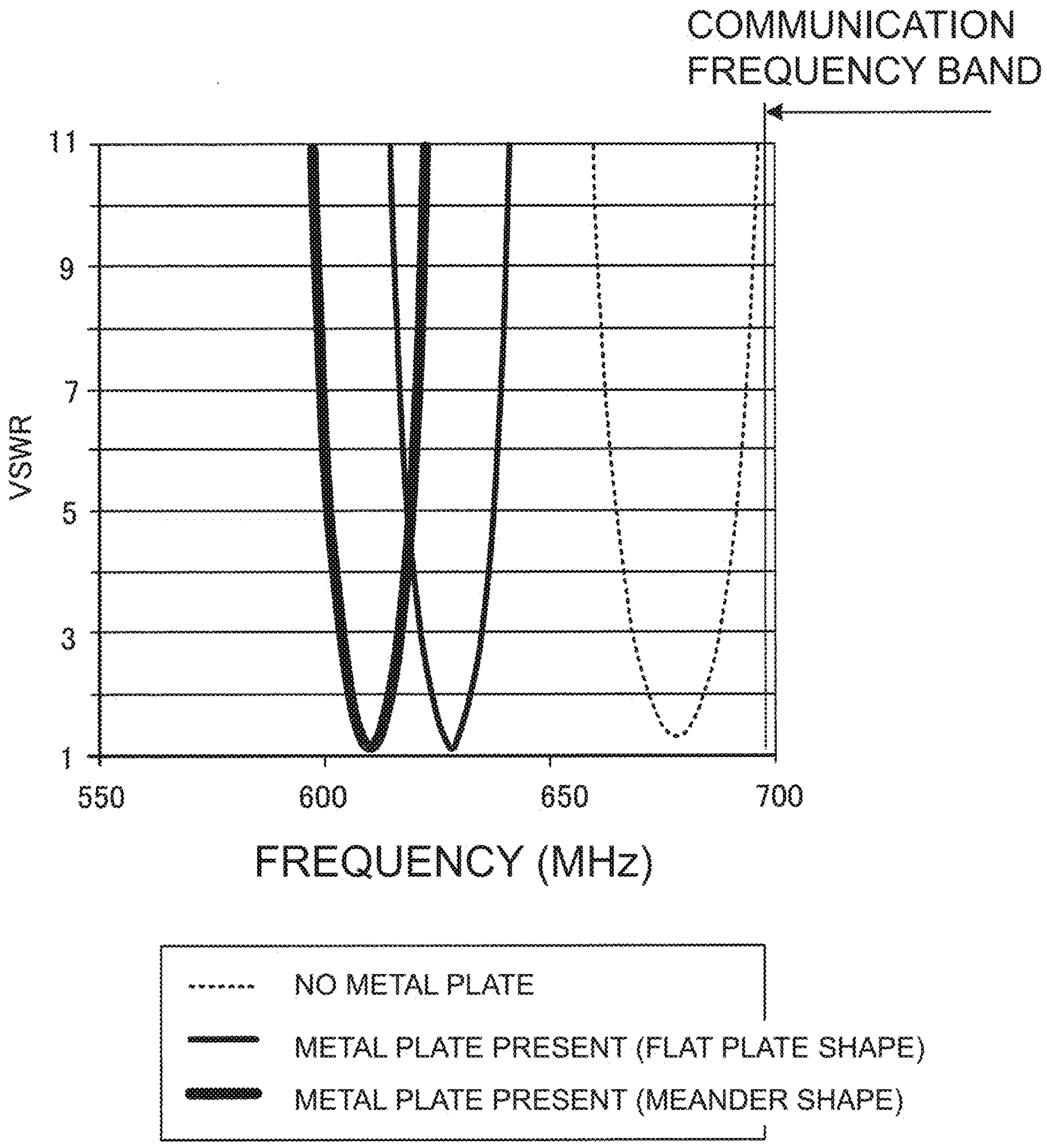
FIG. 5 is a graph of VSWRs regarding the antenna device of the first embodiment (part 1).

FIG. 5 is a graph of a voltage standing wave ratio (VSWR) regarding the antenna device 10 of this embodiment and represents differences in accordance with presence and absence of the metal plate 40.

The antenna element 15 of the antenna device 10 of this embodiment is capable of transmission and/or reception of a signal in a carrier frequency band (for example, a band from 699 MHz to 960 MHz or a band from 1,710 MHz to 2,690 MHz) of a cellular phone. In a case where the metal plate 40 is not provided, as indicated by the broken line, the unnecessary resonance occurs around the lower limit of the communication frequency band. In this case, it may be considered that a sufficient margin may not be obtained in consideration of a change in a mounting situation due to the shape or the like of the roof 3. However, as indicated by the thin solid line and thick solid line, the resonance frequency of the unnecessary resonance is lowered by providing the metal plate 40, and thereby the resonance frequency may largely be separated from the lower limit of the communication frequency band. Even in a case where the metal plate 40 is provided similarly, the metal plate 40 formed into the meander shape like the metal plate 40*a* has the same installation area in a top view but may increase the electrical length compared to the metal plate 40 formed into the rectangular flat plate shape like the metal plate 40*c*. Consequently, the resonance frequency of the unnecessary resonance may be lowered by such an increase.

As described above, in this embodiment, a decrease in antenna gain due to the unnecessary resonance may be prevented by a method other than providing a conductor plate between a metal plate and a roof.

Further, adjustment of the resonance frequency of the unnecessary resonance may be handled by a change in specification of the metal plate 40. Thus, because a die-cast component that is expensive compared to the metal plate 40 (the metal base 30 in this case) may be provided as a common component, it becomes possible to handle plural kinds of vehicles 5 inexpensively and easily.

That is, in a case where the antenna device 10 is configured as a product series applied to different kinds of vehicles, a different version of the metal plate 40 may be prepared. Thus, costs for creation of the product series of course, costs for management of component stocks, and manufacture may be kept very low. Alternatively, plural kinds of metal plates 40 are supplied together from the beginning. Then, in a case where a sufficient antenna gain may not be obtained when the antenna device 10 is mounted on the vehicle, it is possible to immediately and inexpensively take measures at the site by exchanging the metal plates 40.

Further, as a secondary effect, a flat grounding surface may be expanded to a rear end portion side in the housing space of the antenna device 10 by providing the metal plate 40. Accordingly, in a case where an installation position of the antenna element 15 is set to a portion above the metal plate 40 or a case where another antenna element is additionally installed above the metal plate 40, the distance between these antenna elements and the grounding surface as the metal plate 40 becomes the distance as intended in design, and an antenna gain as designed may be obtained.

Second Embodiment

Next, a second embodiment to which the present invention is applied will be described.

In the first embodiment, the method that lowers the resonance frequency of the unnecessary resonance, is employed. However, in this embodiment, a method that conversely raises the resonance frequency of the unnecessary resonance, is employed. In the following, a description will mainly be made about differences from the first embodiment, the same reference numerals are provided to similar configuration elements to the first embodiment, and duplicated descriptions thereof will be omitted.

Figure 6:
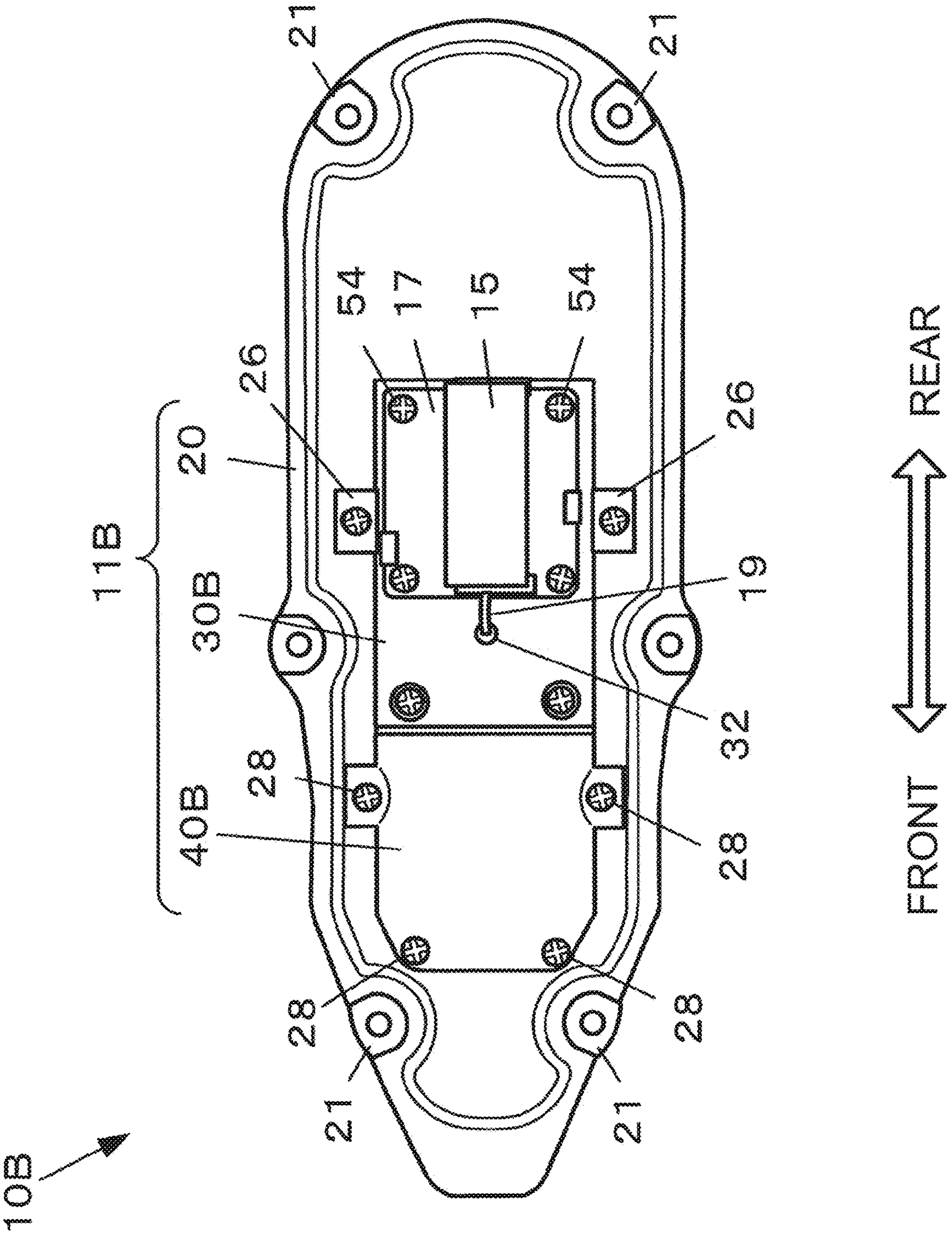
FIG. 6 is an internal plan view of an antenna device of a second embodiment.

FIG. 6 is a plan view of a state where an antenna case of an antenna device 10B of this embodiment is detached. In an antenna base 11B of the antenna device 10B, a metal base 30B is made shorter in the longitudinal direction (front-rear direction) than the antenna base 11 of the first embodiment. Specifically, a metal plate 40B is provided with a gap which is provided on a front end side of the metal base 30B, and the metal plate 40B and the metal base 30B are thereby in an electrically disconnected state.

The front-rear length of the metal base 30B of this embodiment is shorter than that of the metal base 30 of the first embodiment. In the example of FIG. 6, the metal base 30B corresponds to a central portion and a rear portion in a case where the metal base 30 of the first embodiment is divided into three parts of a front portion, the central portion, and the rear portion.

Meanwhile, the metal plate 40B of this embodiment corresponds to the front portion in a case where the metal base 30 of the first embodiment is divided into three parts of the front portion, the central portion, and the rear portion and is attached to the resin base 20 by the attachment screws 28.

Figure 7:
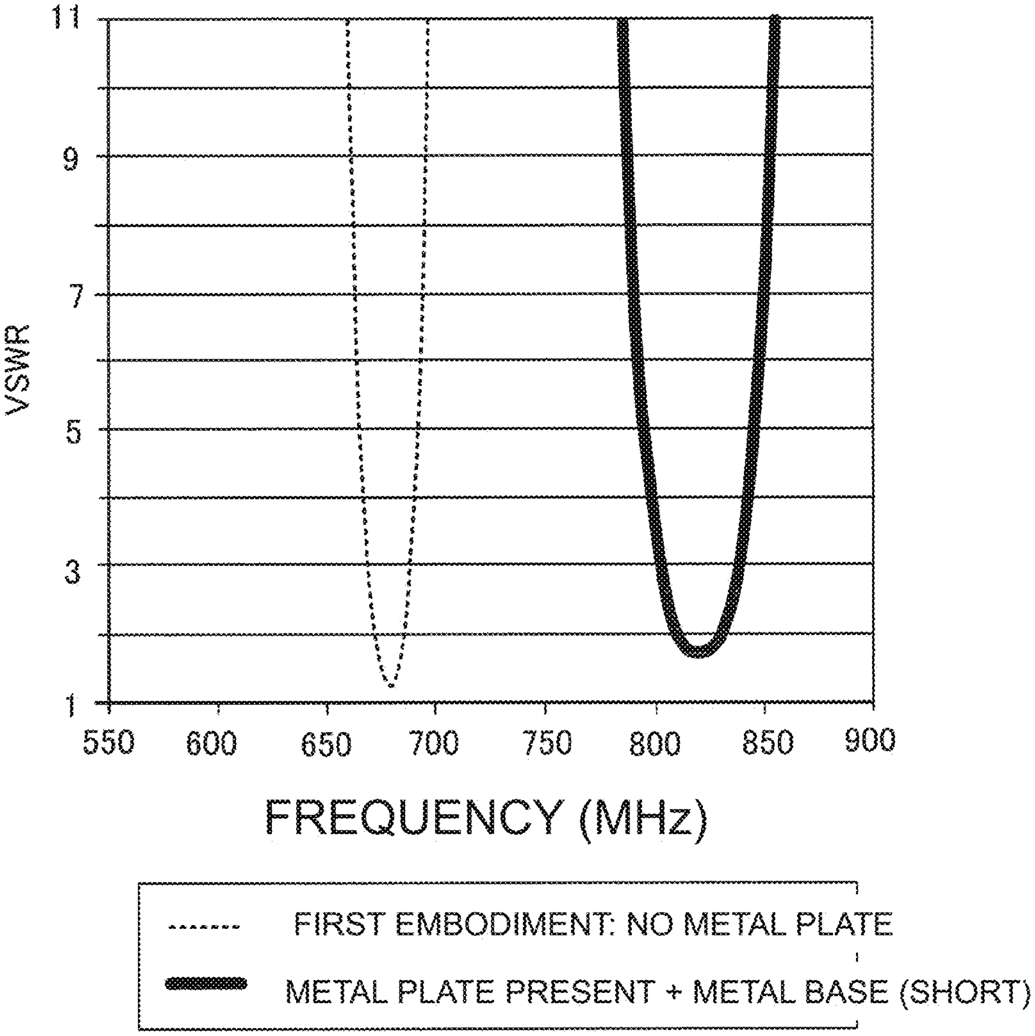
FIG. 7 is a graph of VSWRs regarding the antenna device of the second embodiment (part 1).

FIG. 7 is a VSWR graph about the antenna device 10B of this embodiment. The broken line in FIG. 7 indicates a VSWR curve of a case where no metal plate 40 in the first embodiment is present and only the metal base 30 is present. Meanwhile, the thin solid line indicates a VSWR curve based on the combination of the metal base 30B and the metal plate 40B in this embodiment, and it is clear that the resonance frequency of the unnecessary resonance may be raised.

The antenna device 10B of this embodiment may largely separates the resonance frequency of the unnecessary resonance to a higher frequency than an upper limit of the communication frequency band and may thus obtain similar effects to the antenna device 10 of the first embodiment.

MODIFICATION EXAMPLES

In the above, the examples of the embodiments to which the present invention is applied are described. However, forms to which the present invention is applicable are not limited to the above forms, but appropriate addition, omission, and alterations of the configuration elements may be conducted.

First Modification Example

For example, the metal plate 40 of the first embodiment is in a two-dimensional planar shape, but a three-dimensional shape such as a meander shape in which folds are provided in the vertical direction may be employed.

Second Modification Example

Figure 8:
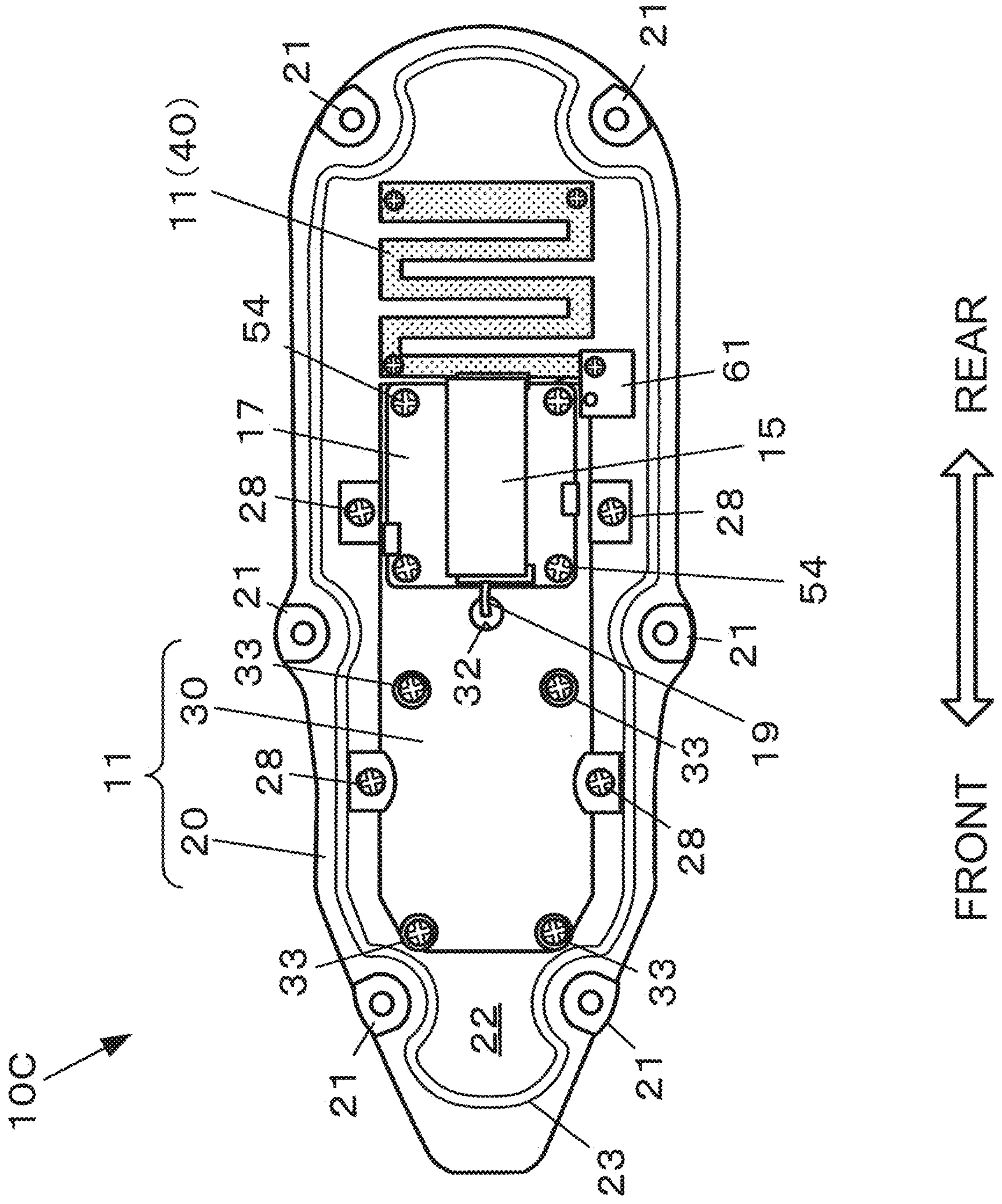
FIG. 8 is an internal plan view of a modification example of the first embodiment.
Figure 12:
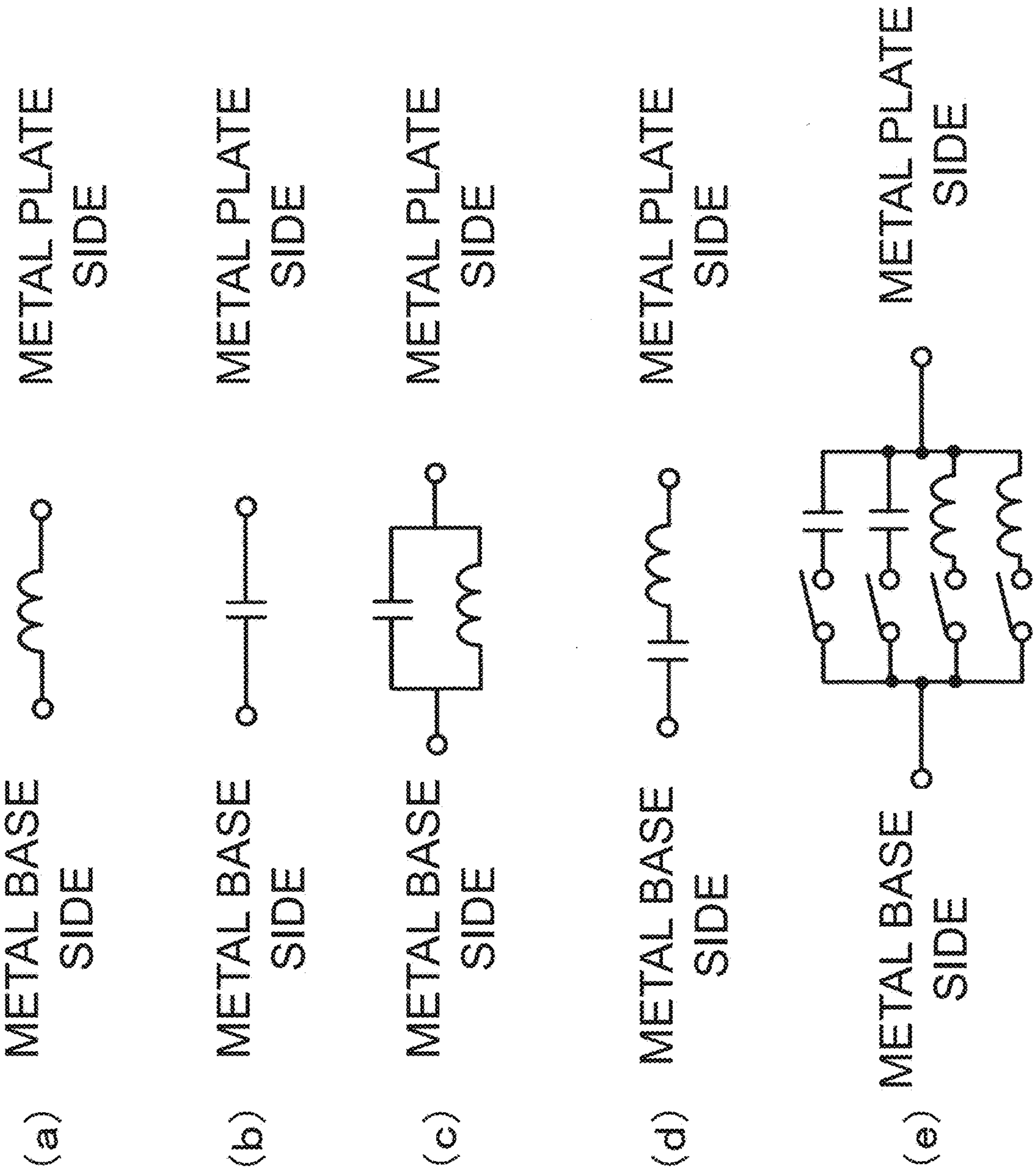
FIG. 12 illustrates configuration examples of an electrical length adjustment circuit.

Further, as an antenna device 10C that is based on the first embodiment and illustrated in FIG. 8, it is possible to have a configuration that the metal base 30 and the metal plate 40 are electrically connected together via an electrical length adjustment circuit 61. The electrical length adjustment circuit 61 is a second electrical length adjustment element for adjusting the resonance frequency of the unnecessary resonance and may be realized as so-called "transmission line length adjustment circuit" or "delay circuit". For example, the electrical length adjustment circuit 61 may be configured only with a coil as in (a) of FIG. 12 or only with a capacitor as in (b) of FIG. 12. Further, the electrical length adjustment circuit 61 may be configured with a circuit in which a capacitor and a coil are connected together in parallel as in (c) of FIG. 12 or may be configured with a circuit in which a capacitor and a coil are connected together in series as in (d) of FIG. 12. A configuration is preferable that switches are provided and circuit constants are thereby made switchable as in (e) of FIG. 12. For example, electrical lengths are made switchable by providing switches that introduce or disconnect elements such as a capacitor or a coil.

Figure 9:
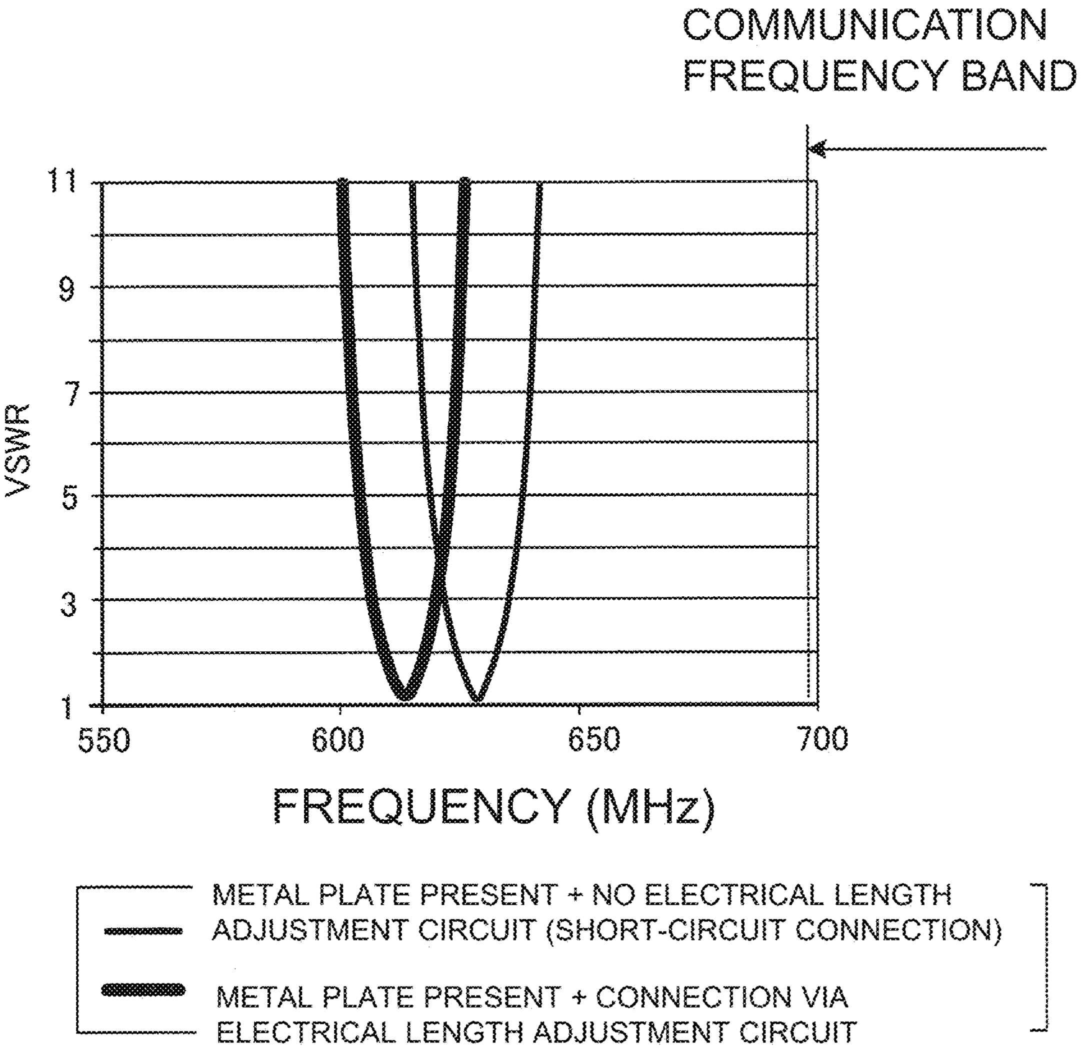
FIG. 9 is a graph of VSWRs regarding the antenna device of the first embodiment (part 2).

FIG. 9 is a VSWR graph regarding the antenna device 10 of the first embodiment and represents differences in accordance with presence and absence of the electrical length adjustment circuit 61. Specifically, the thin solid line indicates a VSWR curve of a case where no electrical length adjustment circuit 61 is present and the metal base 30 and the metal plate 40 are connected together by short-circuit connection (the thin solid line curve in FIG. 5). The thick solid line indicates a VSWR curve of a case where the metal base 30 and the metal plate 40 are connected together via the electrical length adjustment circuit 61 as illustrated in FIG. 8. The electrical length adjustment circuit 61 in this modification example is configured with a circuit as in (a) of FIG. 12, for example. It may be understood from the graph of FIG. 9 that the resonance frequency of the unnecessary resonance may be lowered because the electrical length becomes longer in a case where the metal base 30 and the metal plate 40 are electrically connected together via the electrical length adjustment circuit 61 than a case where the metal base 30 and the metal plate 40 are connected together by short-circuit connection.

Figure 10:
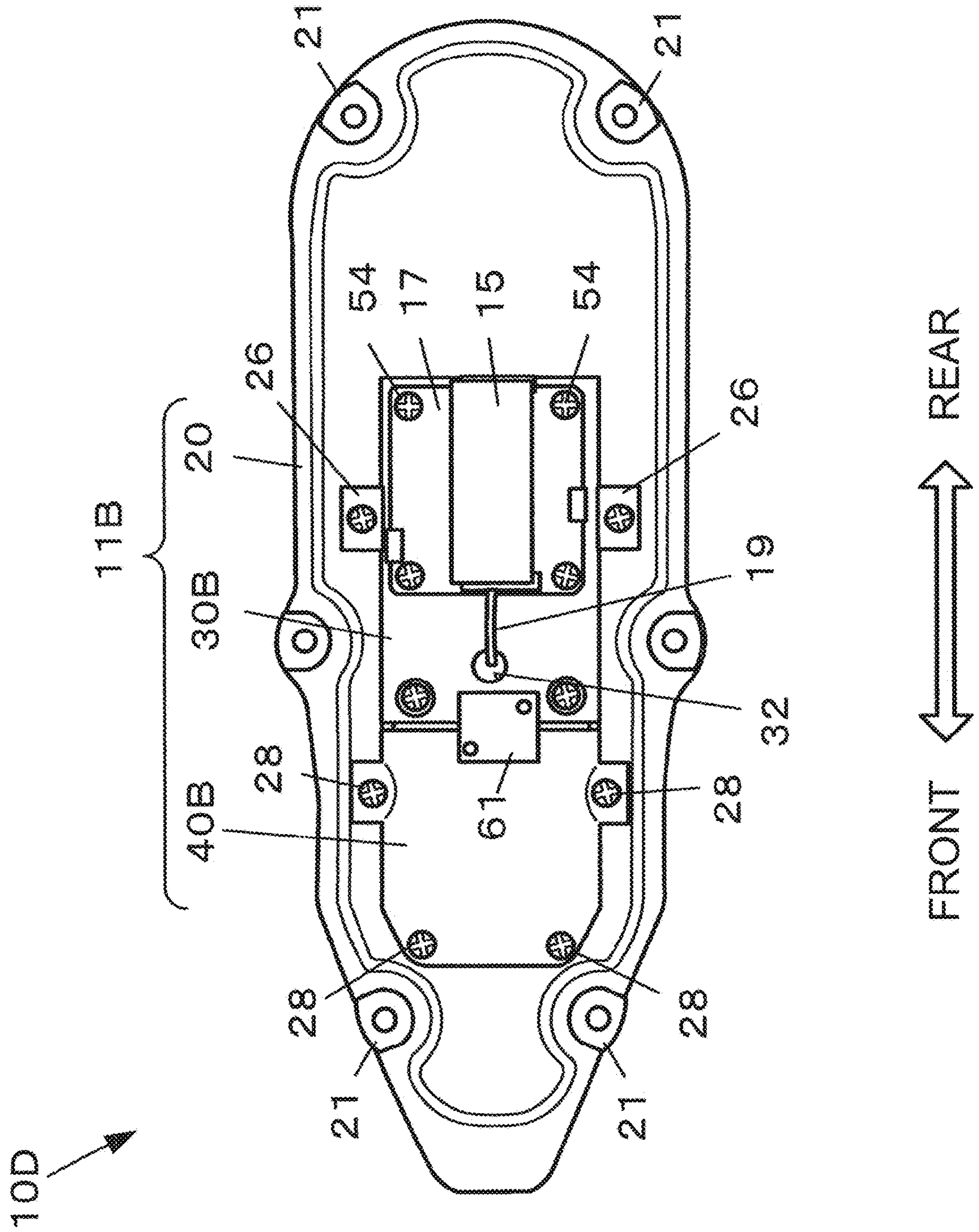
FIG. 10 is an internal plan view of a modification example of the second embodiment.
Figure 13:
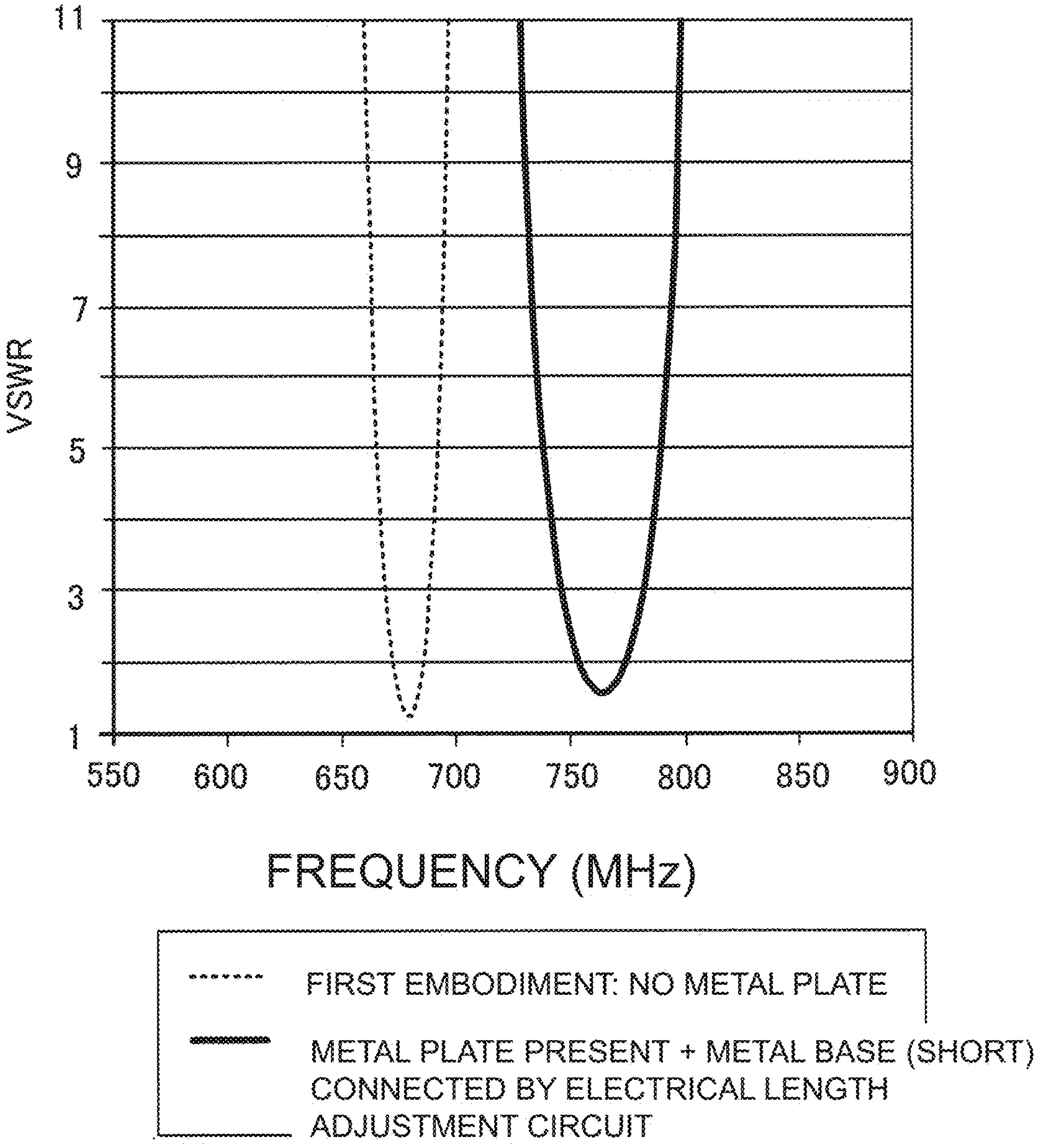
FIG. 13 is a graph of VSWRs regarding the antenna device of the second embodiment (part 2).

Similarly, the antenna device 10B of the second embodiment may be configured such that the metal base 30B and the metal plate 40B are connected together by the electrical length adjustment circuit 61 as an antenna device 10D illustrated in FIG. 10. Specifically, the solid line in the graph of FIG. 13 indicates a VSWR curve of a case where the metal base 30B and the metal plate 40B of the second embodiment are connected together by the electrical length adjustment circuit 61, and it may be understood that the resonance frequency of the unnecessary resonance may be raised. The electrical length adjustment circuit 61 in this modification example is configured with a circuit as in (b) of FIG. 12, for example.

It is possible to lower and raise the resonance frequency of the unnecessary resonance in accordance with the design of the circuit constant of the electrical length adjustment circuit 61. In a case where a switch is provided to the electrical length adjustment circuit 61, a switch that connects or disconnects the metal base 30 and the metal plate 40 may be provided in addition to the switches that introduce or disconnect elements such as a capacitor or a coil as in (e) of FIG. 12.

Third Modification Example

Further, a configuration including one metal plate is explained in the above embodiments, but it is possible to have a configuration including plural metal plates. For example, it is possible to have a configuration that plural metal plates are respectively provided on a front end side and a rear end side of the metal base 30 in an attachment attitude.

Fourth Modification Example

Figure 11:
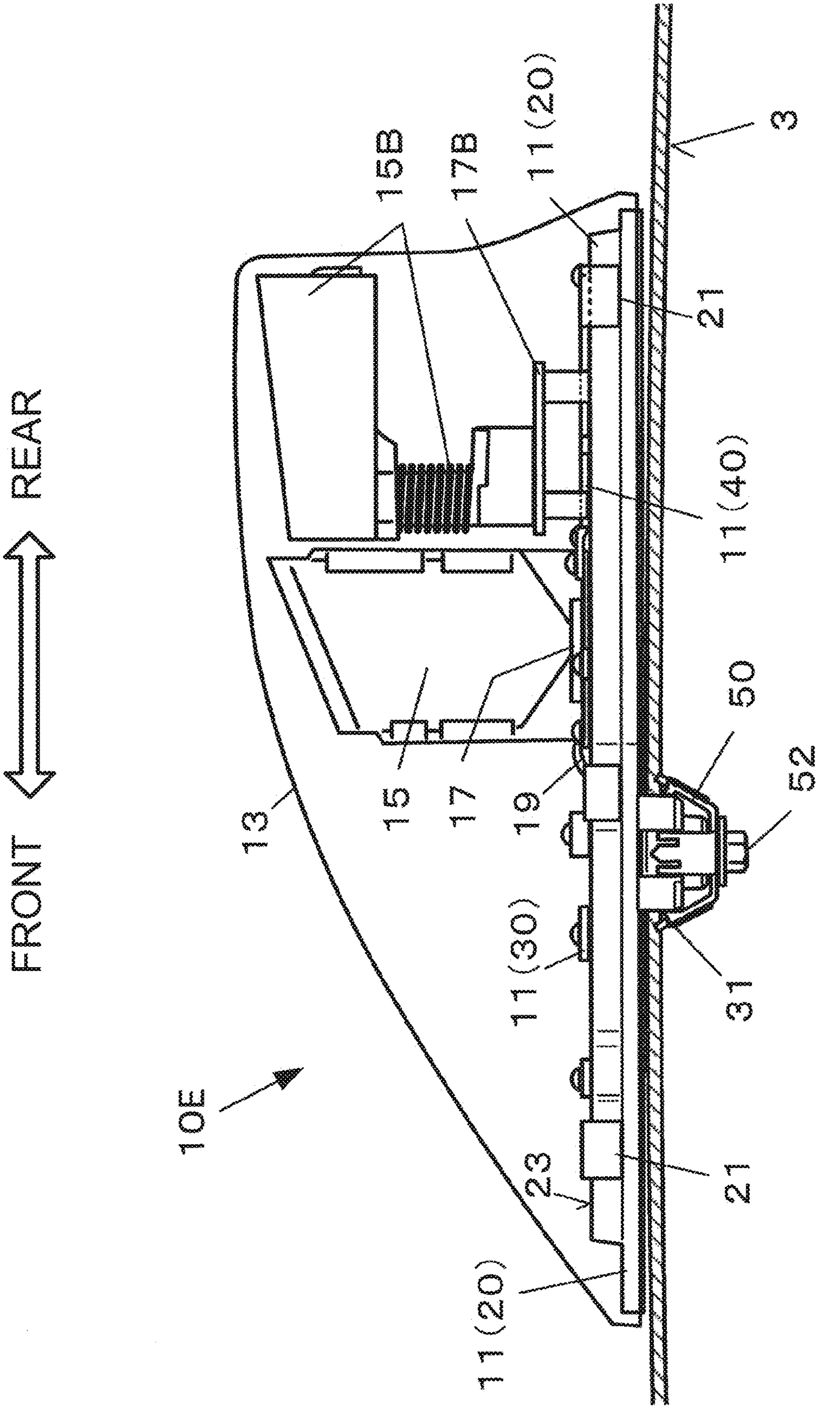
FIG. 11 is a side perspective view that illustrates a configuration example of a modification example of the antenna device of the first embodiment.

Further, in a case where the antenna device of the above embodiments is configured to incorporate a composite antenna, it is preferable to provide a second antenna element and a second substrate above the metal plate. Specifically, as illustrated in FIG. 11, in a case where a composite antenna is formed based on the first embodiment, a second antenna element 15B (such as an antenna for an AM wave or an FM wave) and a second substrate 17B as its substrate are provided above the metal plate 40. The second antenna element 15B is positioned above the metal plate 40 from a front portion to a rear portion.

In the example of FIG. 11, because the metal plate 40 of the first embodiment is arranged close to a rear area of the antenna device, a configuration is made in which the second antenna element 15B and the second substrate 17B are provided in a space in the rear of the antenna element 15 in the antenna case 13. However, as a case of forming the second embodiment as a composite antenna, in a case of a configuration in which the metal plate 40B is provided on a front side of the metal base 30, it is possible to have a configuration that the second antenna element 15B and the second substrate 17B are provided in a space in front of the antenna element 15 in the antenna case 13.

In any case, in a case of a configuration that the second antenna element 15B is provided above the metal plate, the antenna device is placed on whatever kind of vehicle 5, the distance between the second antenna element 15B and the metal plate becomes a fixed distance. Thus, regardless of the shape of the roof 3, a stable antenna gain as designed may be obtained.

If a space is present among plural antenna elements in the antenna device in a planar view, the metal plate may be arranged in a position interposed among the plural antenna elements.

In this embodiment, although the metal plate is used, similar effects may be obtained by arranging a rigid substrate or a flexible substrate on which a pattern is formed. By using a substrate, an electrical length adjustment circuit may be added without increasing structural components.

Fifth Modification Example

In the above-described embodiments, a description is made on the assumption that the size of the metal plate 40 in the width direction (vertical direction in FIG. 2) is the same or generally the same as the size of the metal base 30 in the width direction, but the size is not limited to this. For example, the size of the metal plate 40 in the width direction may be widened or narrowed compared to the size of the metal base 30 in the width direction. Extending the length of the metal plate 40 in the front-rear direction is more effective for shifting the frequency of the unnecessary resonance than widening the size of the metal plate 40 in the width direction.

Sixth Modification Example

Figure 14:
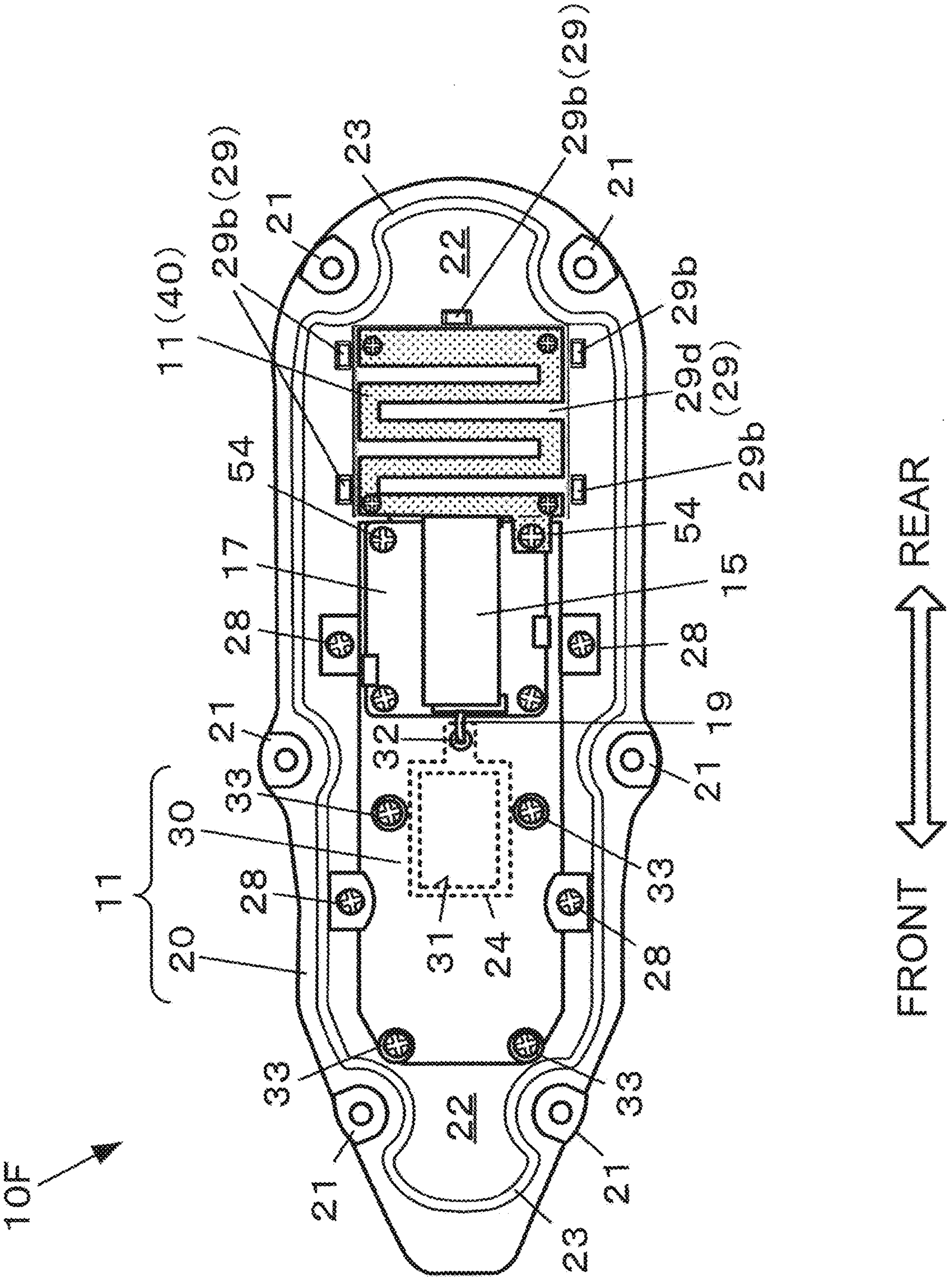
FIG. 14 is an internal plan view of a modification example of the antenna device.

In the above-described embodiments, a description is made on the assumption that the metal plate 40 is arranged on the pedestal portion 22 of the resin base 20. Here, the pedestal portion 22 may be provided with a structure for facilitating positioning in arrangement of the metal plate 40 and inhibiting a position shift from a prescribed position. For example, FIG. 14 is a diagram that illustrates an antenna device 10F as a modification example of the antenna device 10 illustrated in FIG. 2. A different point of the antenna device 10F from the antenna device 10 of FIG. 2 is a point that a positioning shape portion 29 for inhibiting a position shift of the metal plate 40 from a prescribed position is provided in the pedestal portion 22 of the resin base 20. The positioning shape portion 29 includes protrusion portions 29*b* and a recess portion 29*d* but may include only either one of the protrusion portion 29*b* and the recess portion 29*d*. In FIG. 14, a central portion surrounded by plural protrusion portions 29*b* is the recess portion 29*d* that is recessed in a dish-like manner, and the central portion is the prescribed position in which the metal plate 40 is to be arranged. In manufacturing the antenna device 10F, the metal plate 40 may easily be arranged in the prescribed position by the positioning shape portion 29. Specifically, the protrusion portions 29*b* and the recess portion 29*d* may be used as guides in arrangement of the metal plate 40 in the prescribed position. In addition, when the metal plate 40 arranged in the prescribed position is attached by the substrate attachment screws 54, the position shift of the metal plate 40 from the prescribed position may be inhibited by the protrusion portions 29*b* and the recess portion 29*d*. Accordingly, attachment work of the metal plate 40 may become easy.

Seventh Modification Example

Although both of the metal base and the metal plate are used in the first embodiment, a configuration may be made only with the metal plate. In this case, the metal plate has an attachment mechanism to the roof. Since an expensive metal die-cast component is not used and components that connects the metal base with the metal plate are not used either, it becomes possible to reduce cost compared to the first embodiment.

APPLICATION EXAMPLES

A description will be made regarding several more specific application examples based on the above-described embodiments and modification examples.

First Application Example

Figure 15:
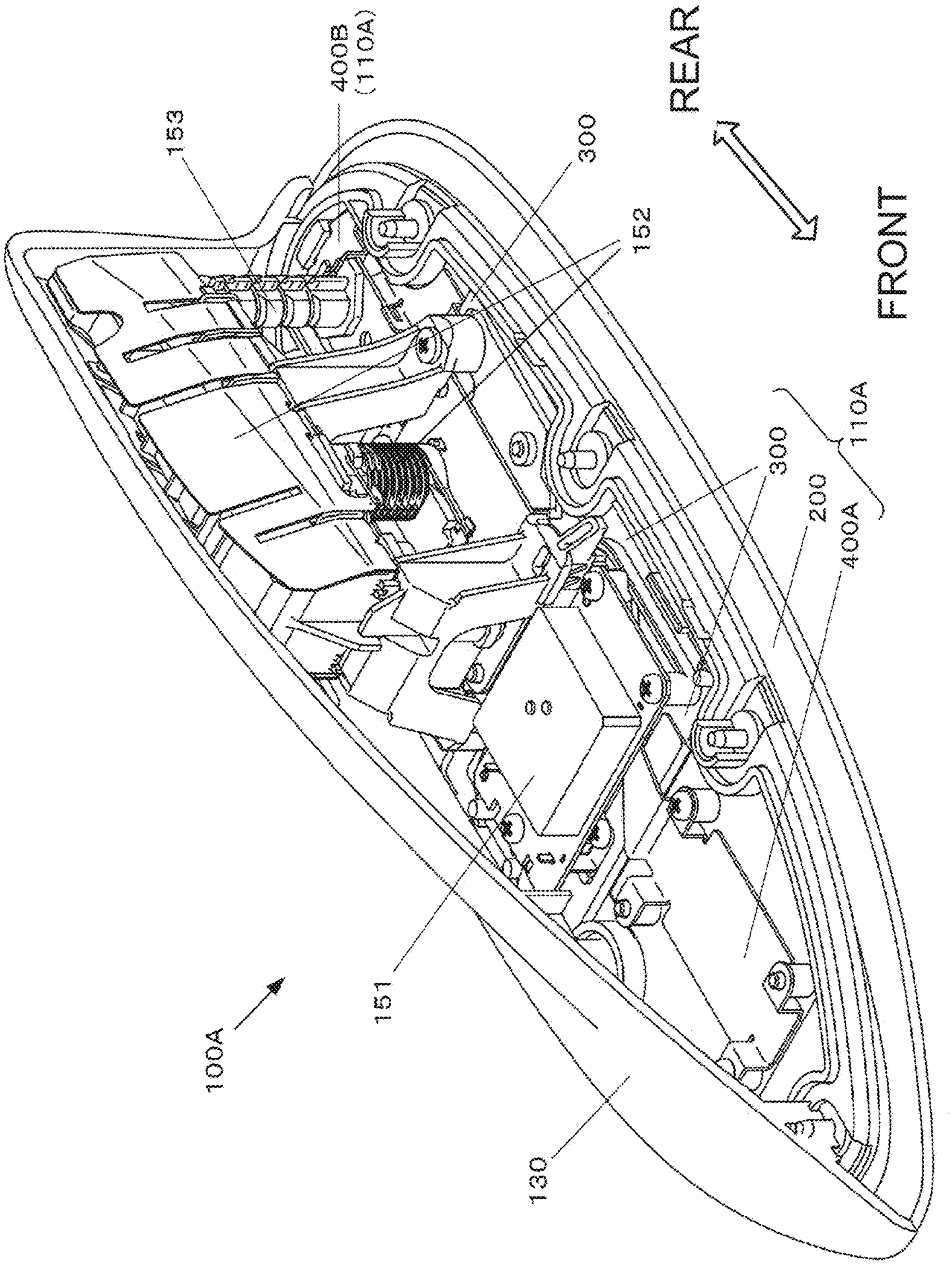
FIG. 15 is an oblique perspective view of an antenna device of a first application example.
Figure 16:
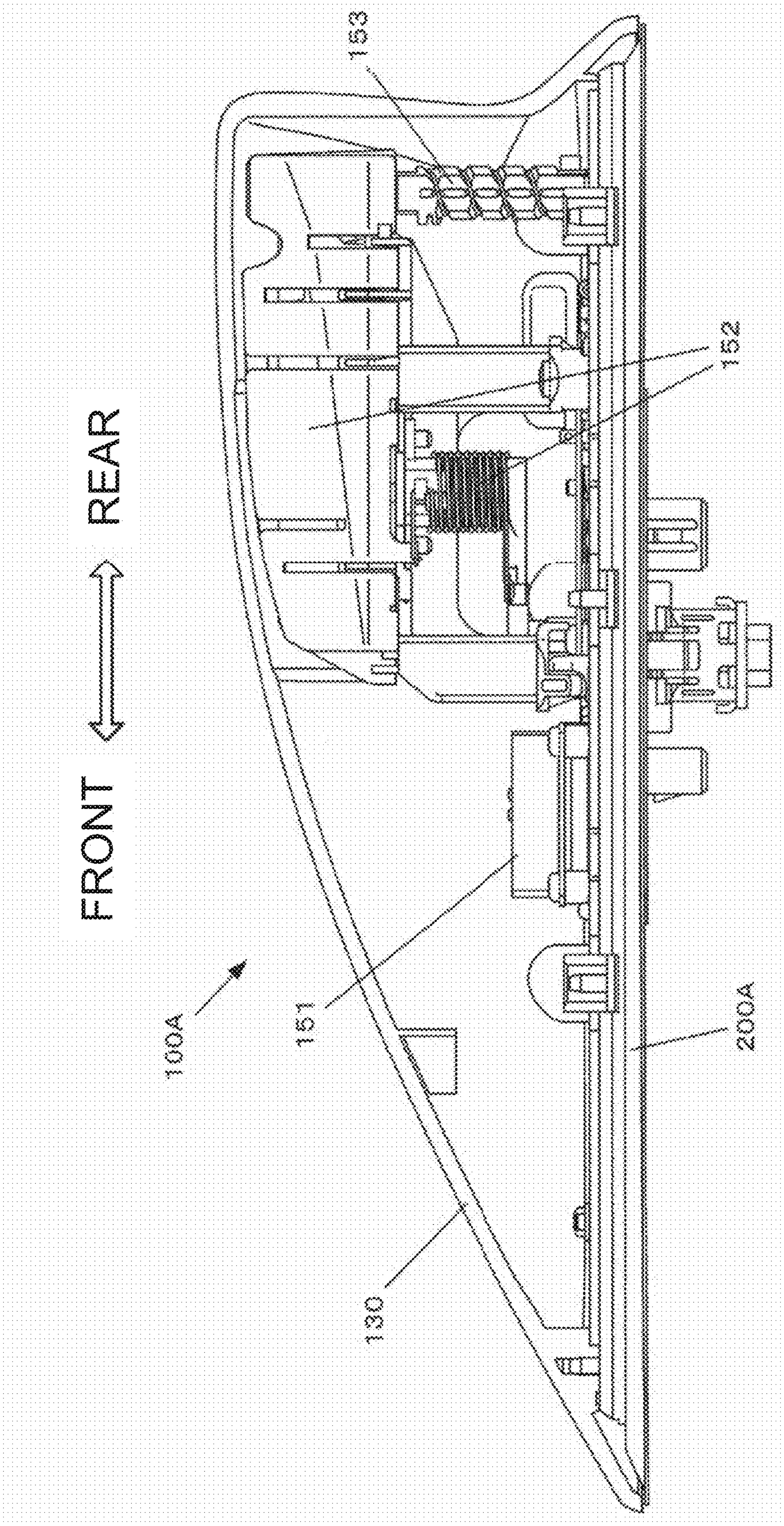
FIG. 16 is a side perspective view of the antenna device of the first application example.

FIG. 15 and FIG. 16 are diagrams that illustrate an antenna device 100A of a first application example. FIG. 15 is an oblique perspective view, and FIG. 16 is a side perspective view. Similarly to the above-described embodiments, the antenna device 100A includes an antenna base 110A, an antenna case 130 covering the antenna base 110A from above, and antenna elements 151, 152, and 153 provided inside the antenna case 130. The antenna base 110A has a resin base 200, a metal base 300 fixed to the roof 3, and a metal plate 400A and a metal plate 400B that are electrically connected with the metal base 300. The metal base 300, the metal plate 400A, and the metal plate 400B are arranged on the resin base 200.

The antenna element 151 is a patch antenna. The antenna element 152 is a radio antenna. The antenna element 153 is a keyless antenna for a keyless entry system. The keyless entry system is also referred to as smart entry system, and an operation frequency of the keyless antenna is 925 MHz, for example.

The antenna device 100A includes the antenna element 153 for the keyless antenna in the rear of the metal base 300. The antenna element 153 is arranged on the metal plate 400B. Thus, similarly to the antenna device 10B illustrated in FIG. 6, the antenna device 100A includes the metal plate 400A in front of the metal base 300. The frequency of the unnecessary resonance that occurs due to the metal base 300, the metal plate 400A, the metal plate 400B, and the roof 3 becomes a frequency out of the band of the operation frequency of the keyless antenna. As a result, a gain of the keyless antenna may be improved.

Second Application Example

Figure 17:
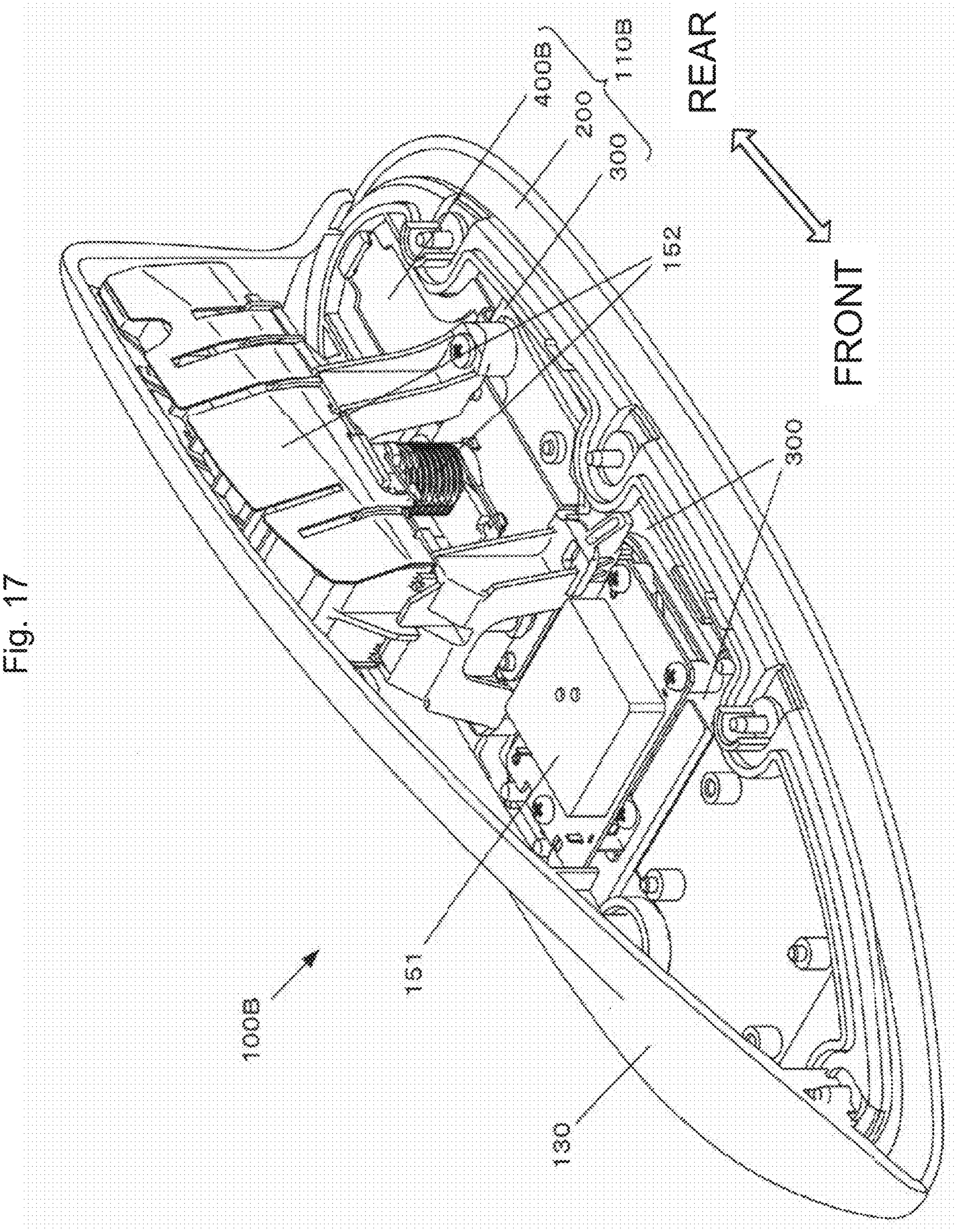
FIG. 17 is an oblique perspective view of an antenna device of a second application example.

FIG. 17 is a diagram that illustrates an antenna device 100B of a second application example and is an oblique perspective view. Similarly to the above-described embodiments, the antenna device 100B includes an antenna base 110B, the antenna case 130 covering the antenna base 110B from above, and the antenna elements 151 and 152 provided inside the antenna case 130. The antenna base 110B has the resin base 200, the metal base 300 fixed to the roof 3, and the metal plate 400B electrically connected with the metal base 300. The metal base 300 and the metal plate 400B are arranged on the resin base 200. The antenna element 151 is a patch antenna. The antenna element 152 is a radio antenna.

The antenna device 100B of the second application example has a configuration that the antenna element 153 and the metal plate 400A are removed from the antenna device 100A of the first application example. The positional relationship between the metal base 300 and the metal plate 400B is similar to the antenna device 10 in FIGS. 2 and 3 and an antenna device 10E in FIG. 11. A configuration is made such that a portion of the antenna element 152 is positioned above the metal plate 400B. In other words, a rear end side of the antenna element 152 is positioned above the metal plate 400B.

The metal bases 30 and 300 are described as die-cast products of an aluminum alloy, for example, but may be fabricated from sheet metal. Further, the metal plates 40, 400, 400A, and 400B are metal components of a different material from the metal bases 30 and 300 but may be formed from the same material.

Third Application Example

Figure 18:
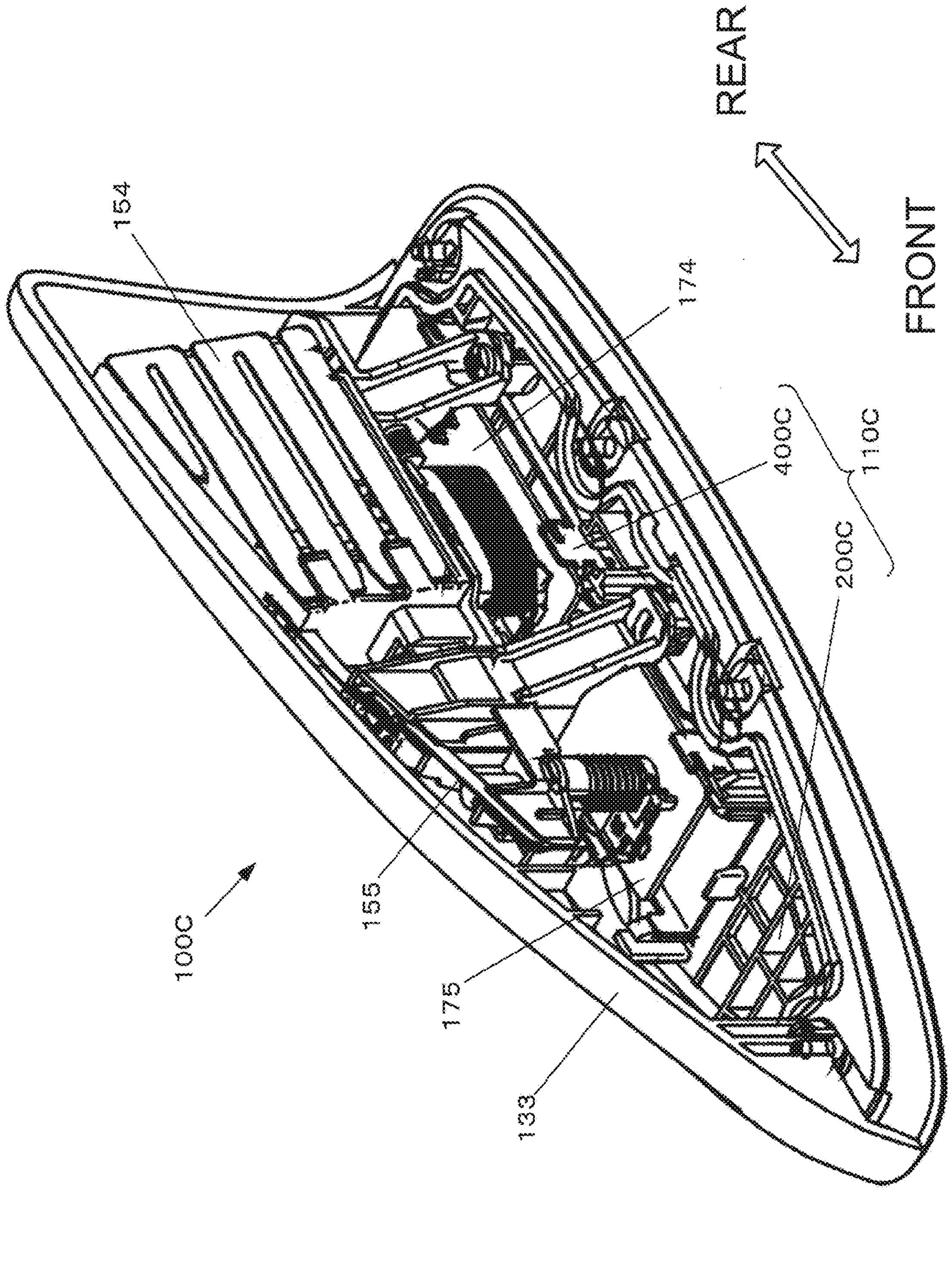
FIG. 18 is an oblique perspective view of an antenna device of a third application example.
Figure 19:
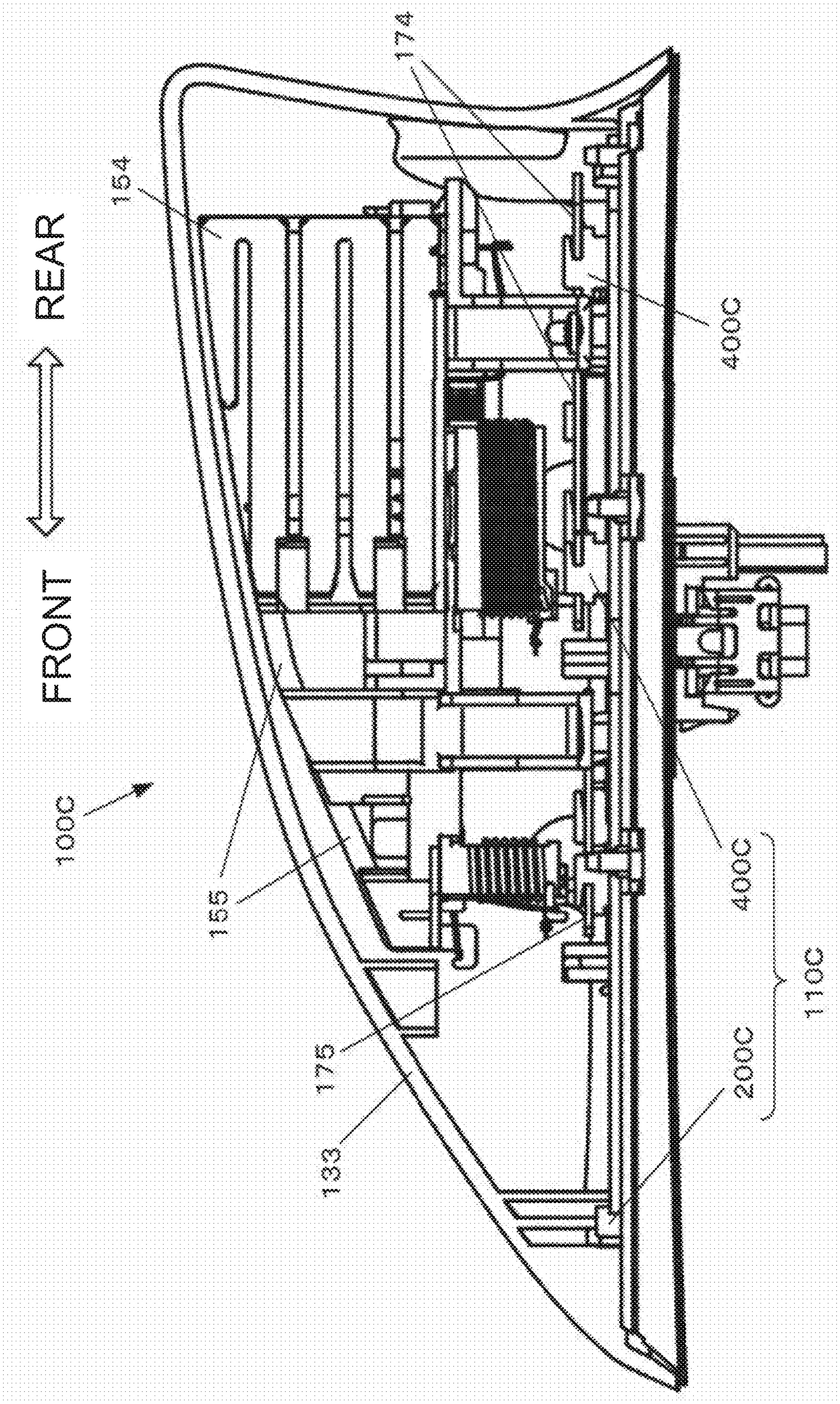
FIG. 19 is a side perspective view of the antenna device of the third application example.

FIG. 18 and FIG. 19 are diagrams that illustrate an antenna device 100C of a third application example. FIG. 18 is an oblique perspective view, and FIG. 19 is a side perspective view. Similarly to the above-described embodiments, the antenna device 100C includes an antenna base 110C, an antenna case 133 covering the antenna base 110C from above, and antenna elements 154 and 155 provided inside the antenna case 133, a circuit board 174 for the antenna element 154, and a circuit board 175 for the antenna element 155. The antenna base 110C has a resin base 200C and a multi-use metal plate 400C fixed to the roof 3. The multi-use metal plate 400C is arranged on the resin base 200C. The multi-use metal plate 400C is a multi-use plate that is formed by integration of the metal base and the metal plate and is used as both of those. Thus, a multi-use metal plate 400C may be considered as a metal base that includes functions of the metal plate of the above-described embodiments. The antenna element 155 is an antenna for television broadcasting (digital terrestrial television broadcasting), and the circuit board 175 is a circuit board for DTTB reception. The antenna element 154 is a radio antenna (an antenna for radio), and the circuit board 174 is a circuit board for radio broadcasting reception.

Figure 20:
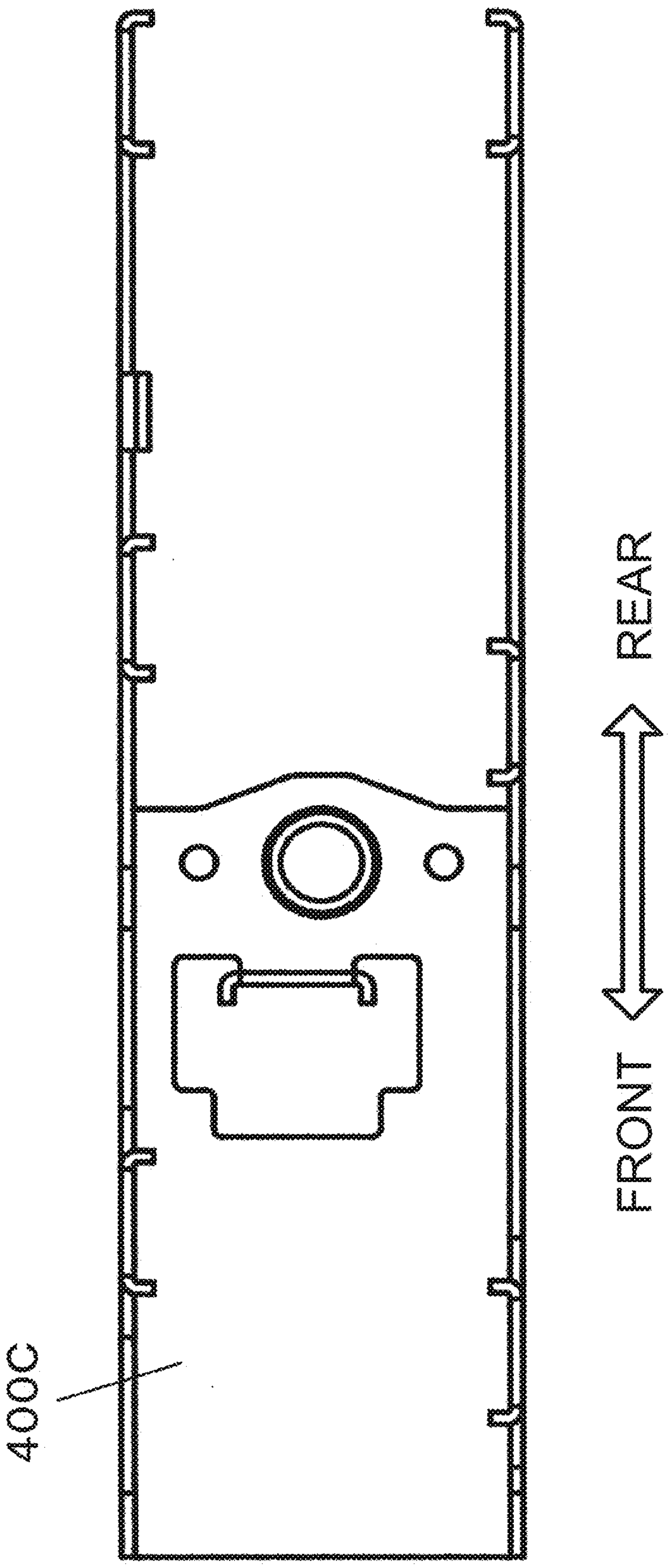
FIG. 20 is a plan view of a metal plate used in the antenna device of the third application device.
Figure 21:
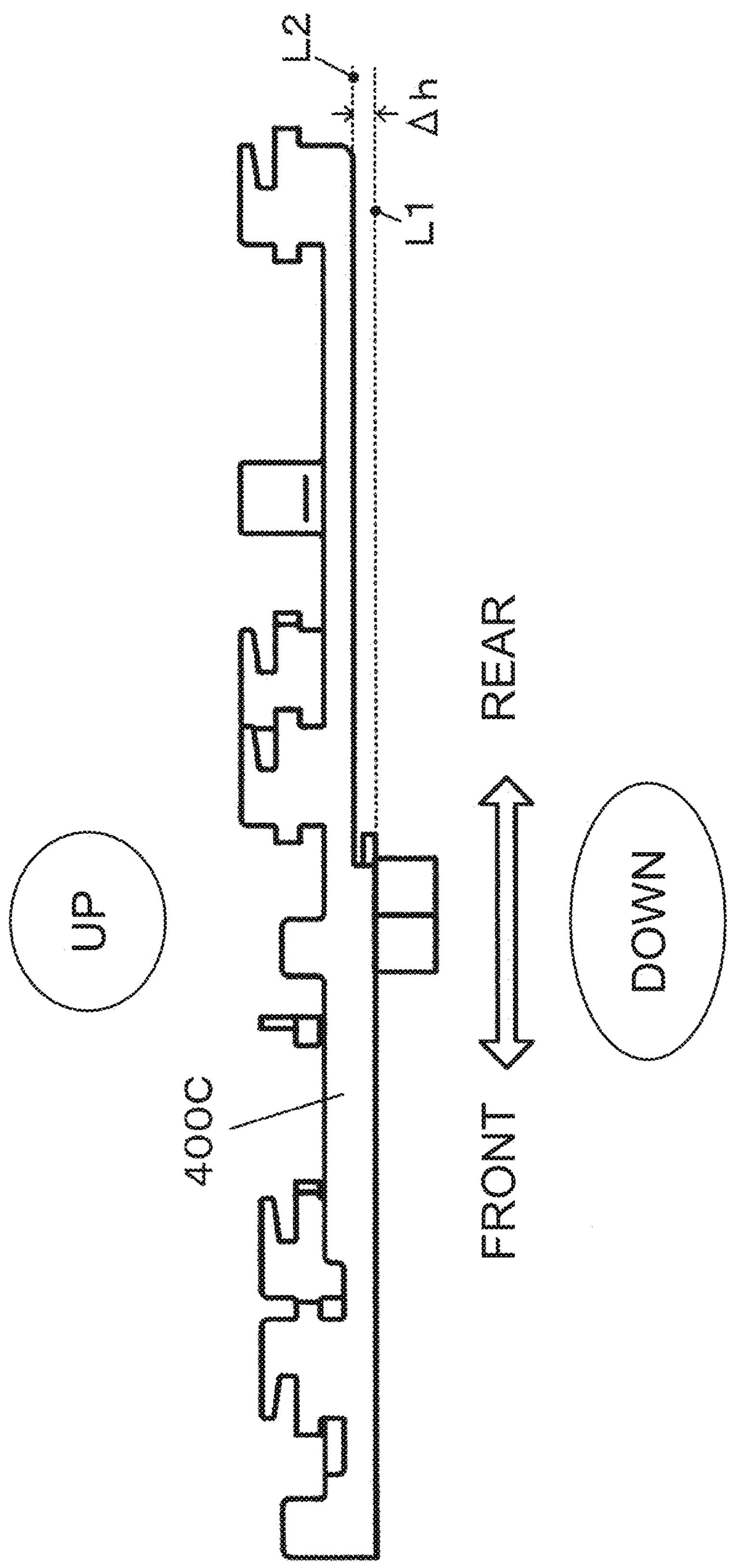
FIG. 21 is a side view of the metal plate used in the antenna device of the third application device.
Figure 22:
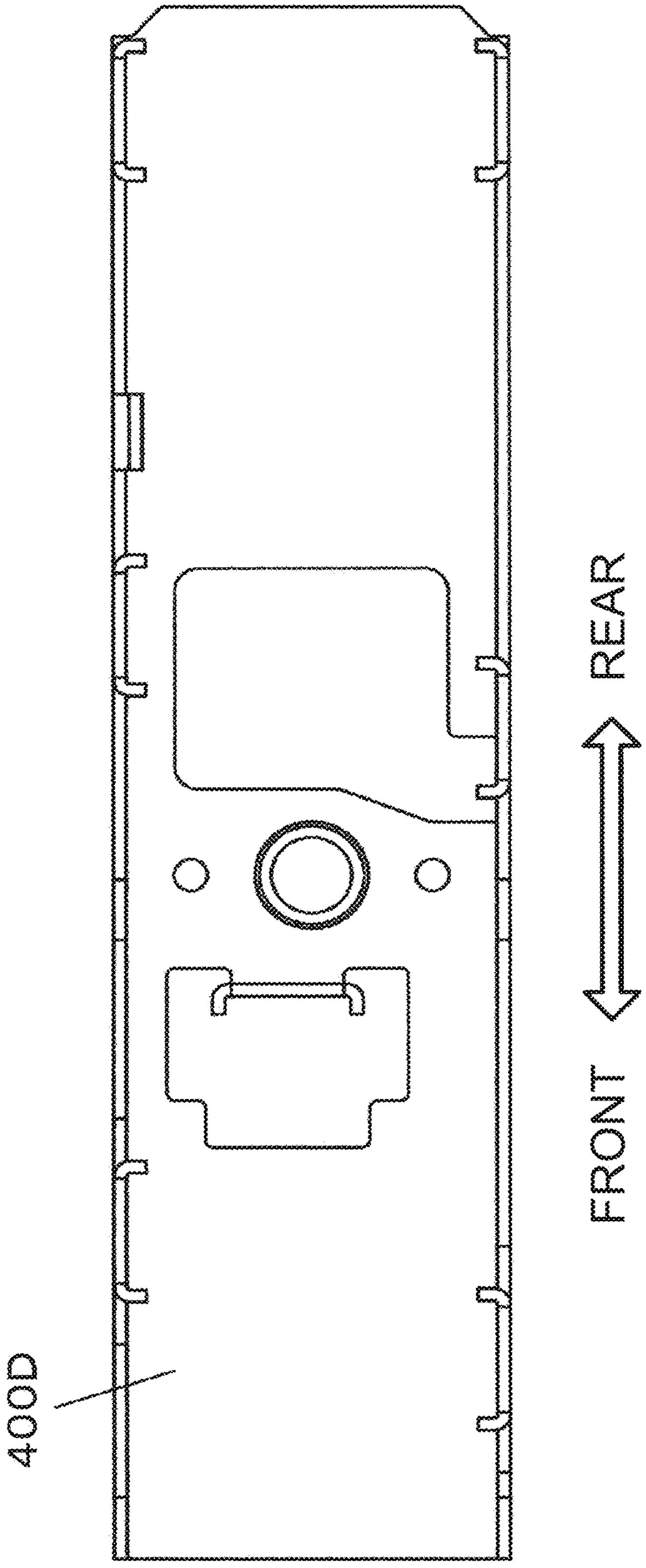
FIG. 22 is a plan view of a metal plate of a comparative example.
Figure 23:
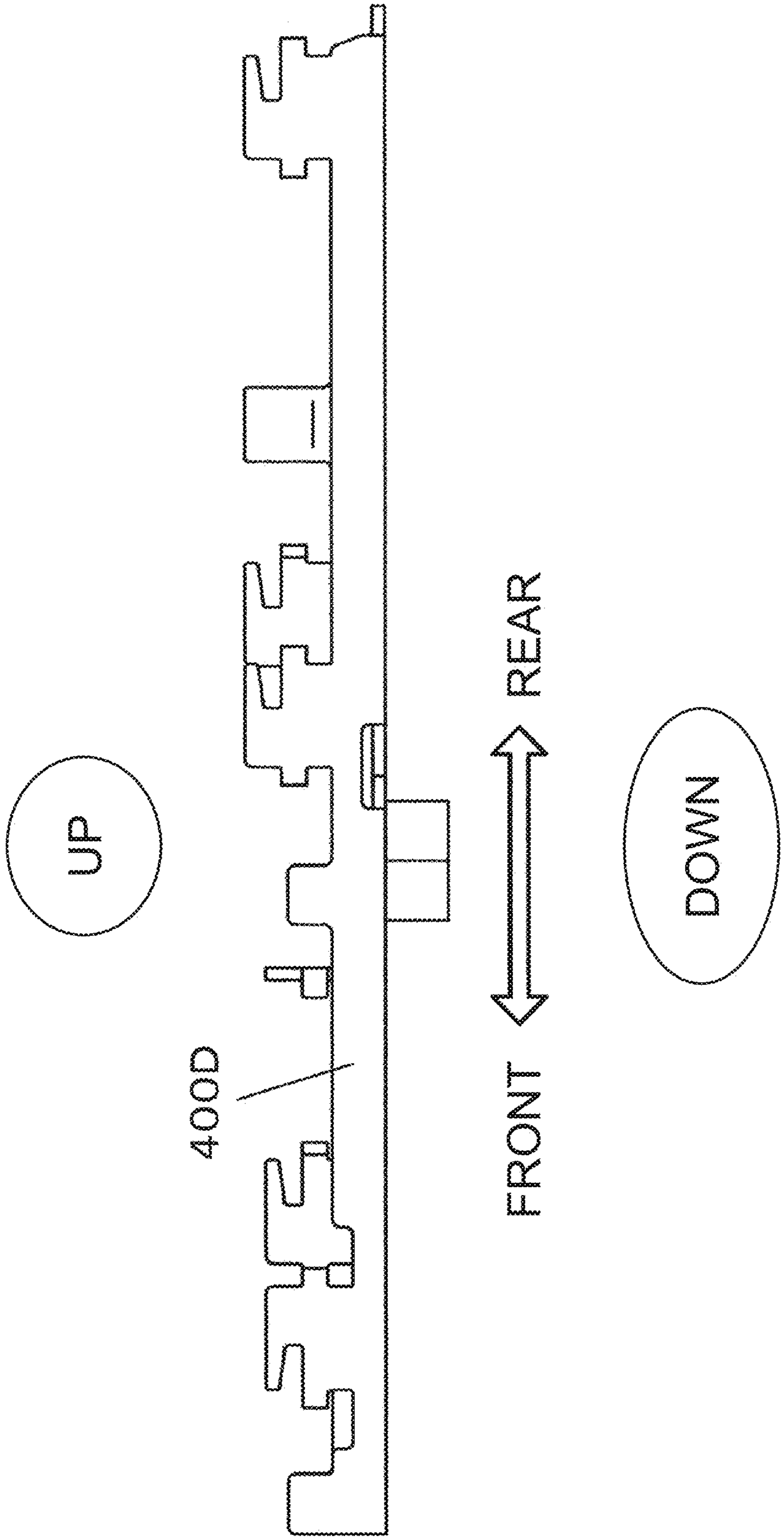
FIG. 23 is a side view of the metal plate of the comparative example.

FIG. 20 and FIG. 21 illustrate the multi-use metal plate 400C. FIG. 20 is a plan view, and FIG. 21 is a side view. Further, FIG. 22 and FIG. 23 illustrate a multi-use metal plate 400D as a comparative example. FIG. 22 is a plan view of the multi-use metal plate 400D of the comparative example, and FIG. 23 is a side view of the multi-use metal plate 400D of the comparative example.

It is possible to use the multi-use metal plate 400D of the comparative example for the antenna device 100C of the third application example, however, the antenna device 100C is configured not by using the multi-use metal plate 400D but by using the multi-use metal plate 400C. The multi-use metal plate 400C has a shape in which a central portion on a rear side is hollowed out in an attachment attitude. Explaining it in relation to the antenna element 154, a portion or the whole of the antenna element 154 is positioned above the multi-use metal plate 400C. The multi-use metal plate 400C has a shape in which a portion positioned below the antenna element 154 is partially hollowed out.

Further, in the multi-use metal plate 400C, a height position L2 of a lower surface on a rear side is formed high by a height $\Delta h$ compared to a height position L1 of the lower surface on a front side. Accordingly, when the antenna device 100C is attached to the roof 3, the distance between the rear side of the multi-use metal plate 400C and the roof 3 may be made long. Thus, the capacitance that occurs between the roof 3 and the multi-use metal plate 400C is reduced, the resonance frequency of the unnecessary resonance is shifted to a high frequency side of the communication frequency band of the antenna element, and a decrease in antenna gain may thereby be inhibited.

REFERENCE SIGNS LIST

3 roof
10 antenna device
11 antenna base
13 antenna case
15 antenna element
17 substrate
20 resin base
30 metal base
32 cable insertion hole
40 metal plate
52 antenna fixing bolt
61 electrical length adjustment circuit

The invention claimed is:

1. An antenna device that is attached to a vehicle, the antenna device comprising:
- a plate-shaped body made by resin;
- a metal plate arranged on the plate-shaped body;
- a substrate fixed to the metal plate; and
- an antenna connected to the substrate,
- wherein the metal plate is formed from at least one of sheet metal and conductive resin,
- the metal plate includes a portion which is different in a height between a lower surface of the plate-shaped body and a lower surface of the metal plate,
- the metal plate is placed to be opposed to a roof of the vehicle,
- a projection portion for fixing to the roof is provided on a surface of the metal plate facing the roof,
- the metal plate and the roof are electrically connected together via the projection portion, and
- a resonance frequency that occurs due to the roof and the metal plate that are electrically connected together via the projection portion is out of a communication frequency band of the antenna.

2. The antenna device according to claim 1, wherein the metal plate includes a cutout portion, and
- at least a part of the antenna overlaps the cutout portion in a top view.

3. The antenna device according to claim 1, wherein the plate-shaped body has a pedestal portion inhibiting a position shift of the metal plate.

4. The antenna device according to claim 1, wherein the surface of the metal plate facing the roof has a step.

5. The antenna device according to claim 1, wherein a protrusion for supporting the substrate is provided on a surface of the metal plate opposite to the surface facing the roof.

6. The antenna device according to claim 1, wherein the metal plate has a hole.

7. The antenna device according to claim 1, wherein the metal plate enhances strength of the plate-shaped body made by resin.

8. The antenna device according to claim 1, wherein a size of the metal plate in a longitudinal direction of the antenna device is longer than a size of the metal plate in a width direction of the antenna device.

* * * * *